US012795459B2

(12) United States Patent
Zhang et al.

(10) Patent No.: US 12,795,459 B2
(45) Date of Patent: Nov. 10, 2026

(54) COMMUNICATION METHOD AND APPARATUS

(71) Applicant: Huawei Technologies Co., Ltd., Shenzhen (CN)

(72) Inventors: Haisen Zhang, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 18/634,335

(22) Filed: Apr. 12, 2024

(65) Prior Publication Data

US 2024/0267795 A1 Aug. 8, 2024

Related U.S. Application Data

(63) Continuation of application No. PCT/CN2022/122879, filed on Sep. 29, 2022.

(30) Foreign Application Priority Data

Oct. 15, 2021 (CN) ......................... 202111202345.1
Aug. 9, 2022 (CN) ......................... 202210952975.9

(51) Int. Cl.
*H04W 36/00* (2009.01)
*H04W 84/04* (2009.01)

(52) U.S. Cl.
CPC ...... *H04W 36/0007* (2018.08); *H04W 84/042* (2013.01)

(58) Field of Classification Search
CPC . H04W 36/0007; H04W 84/042; H04W 8/24; H04W 36/00; H04W 36/08; H04W 72/30; H04W 76/40; H04W 4/06; H04W 72/0453; H04W 72/0457; H04W 72/563
See application file for complete search history.

(56) References Cited

U.S. PATENT DOCUMENTS

| | | | | |
|---|---|---|---|---|
| 9,173,192 | B2 | 10/2015 | Zhang et al. | |
| 9,723,523 | B2 * | 8/2017 | Purnadi | H04W 36/0007 |
| 10,219,245 | B2 * | 2/2019 | Prasad | H04W 72/30 |
| 10,588,130 | B2 * | 3/2020 | Raghunathan | H04W 72/51 |

(Continued)

FOREIGN PATENT DOCUMENTS

| | | |
|---|---|---|
| CN | 103096256 A | 5/2013 |
| CN | 103428637 A | 12/2013 |

(Continued)

OTHER PUBLICATIONS

Huawei, CBN, HiSilicon. 3GPP TSG-RAN WG2 Meeting #119 electronic, Online, Aug. 17-29, 2022. R2-2207592."Discussion on decoding of the TMGI in MII." total 3 pages.

(Continued)

*Primary Examiner* — Michael A Keller
(74) *Attorney, Agent, or Firm* — Slater Matsil, LLP

(57) ABSTRACT

A method includes: determining capability information, and sending the capability information to an access network device, where the capability information indicates a multicast service receiving capability corresponding to a band, and/or a multicast service receiving capability corresponding to a component carrier. The capability information indicates a multicast service capability at a band level or a component carrier level.

20 Claims, 8 Drawing Sheets

(56) References Cited

U.S. PATENT DOCUMENTS

| | | | | |
|---|---|---|---|---|
| 2016/0374050 | A1 | 12/2016 | Prasad et al. | |
| 2018/0227904 | A1* | 8/2018 | Raghunathan .......... | H04W 8/22 |
| 2019/0349892 | A1 | 11/2019 | Rico Alvarino et al. | |
| 2020/0229069 | A1* | 7/2020 | Chun .................... | H04W 76/30 |
| 2021/0258918 | A1 | 8/2021 | Hong | |

FOREIGN PATENT DOCUMENTS

| | | | | | |
|---|---|---|---|---|---|
| CN | 103733703 | A | | 4/2014 | |
| CN | 104904266 | A | | 9/2015 | |
| CN | 108307681 | A | | 7/2018 | |
| CN | 111866975 | A | * | 10/2020 | .............. H04W 4/06 |
| CN | 111918276 | A | | 11/2020 | |
| CN | 112118542 | A | | 12/2020 | |
| CN | 112153558 | A | | 12/2020 | |
| CN | 112911654 | A | | 6/2021 | |
| CN | 113498027 | A | | 10/2021 | |
| CN | 116193376 | B | | 12/2023 | |
| JP | 2014531839 | A | | 11/2014 | |
| JP | 2016220260 | A | | 12/2016 | |
| JP | 7434585 | B2 | * | 2/2024 | ............ H04W 12/08 |
| WO | 2016159845 | A1 | | 10/2016 | |
| WO | 2016162547 | A1 | | 10/2016 | |
| WO | 2017082660 | A1 | | 5/2017 | |
| WO | 2017095434 | A1 | | 6/2017 | |
| WO | 2021145746 | A1 | | 7/2021 | |
| WO | WO-2021182770 | A1 | * | 9/2021 | .............. H04W 4/06 |
| WO | 2021203881 | A1 | | 10/2021 | |

OTHER PUBLICATIONS

ZTE, 3GPP TSG RAN WG3 Meeting #103, Athens, Greece, Feb. 25 Mar. 1, 2019. R3-190399. "Further discussion on PLMN information for RAN sharing." total 6 pages.

Huawei: "WID: Service continuity and location information for MBMS for LTE", TSG-RAN Meeting 51 Kansas City, USA, Mar. 15-18, 2011. RP-110452, total 5 pages.

3rd Generation Partnership Project; Technical Specification Group Radio Access Network; Evolved Universal Terrestrial Radio Access (E-UTRA); Physical layer procedures (Release 16). 3GPP TS 36.213 V16.7.0 (Sep. 2021). total 577 pages.

3rd Generation Partnership Project; Technical Specification Group Radio Access Network; Evolved Universal Terrestrial Radio Access (E-UTRA); Radio Resource Control (RRC); Protocol specification (Release 16). 3GPP TS 36.331 V16.6.0 (Sep. 2021). total 1091 pages.

3rd Generation Partnership Project; Technical Specification Group Radio Access Network; NR; Radio Resource Control (RRC) protocol specification (Release 16). 3GPP TS 38.331 V16.6.0 (Sep. 2021). total 961 pages.

Huawei et al:"Discussions on System Information handling by ng-eNB." 3GPP TSG-RAN WG3 #103 R3-190611 Athens, Greece, Feb. 25-Mar. 1, 2019. total 15 pages.

Ericsson et al:"IoT UE capabilities for MBMS user service." SA WG2 Meeting #122 S2-174146 Jun. 26-30, 2017, San Jose Del Cabo, Mexico. total 7 pages.

* cited by examiner

COMMUNICATION METHOD AND APPARATUS

CROSS-REFERENCE TO RELATED APPLICATIONS

This application is a continuation of International Application No. PCT/CN2022/122879, filed on Sep. 29, 2022, which claims priority to Chinese Patent Application No. 202111202345.1, filed on Oct. 15, 2021 and Chinese Patent Application No. 202210952975.9, filed on Aug. 9, 2022. All of the aforementioned patent applications are hereby incorporated by reference in their entireties.

TECHNICAL FIELD

This application relates to the field of communication technologies, and in particular, to a communication method and apparatus.

BACKGROUND

A multimedia broadcast multicast service (MBMS) or a groupcast/multicast broadcast service (MBS) is mainly a service oriented to a plurality of user equipments (UEs), for example, live broadcast and scheduled program playing.

In long term evolution (LTE), an access network device may obtain UE capability information in a capability query process, where the UE capability information includes MBMS capability information.

Currently, the MBMS capability information designed for LTE is at a UE level, and supports reporting only a maximum bandwidth used for the MBS. However, in this manner, a multicast capability of a UE cannot be accurately reported. Therefore, how to accurately report the multicast capability of the UE still needs to be further studied.

SUMMARY

This application provides a communication method and apparatus, to resolve a problem that multicast capability reporting accuracy of a terminal device is low.

According to a first aspect, this application provides a communication method. The method may be performed by a first communication apparatus. The first communication apparatus may be a communication device; or may be a communication apparatus, for example, a chip, that can support a communication device in implementing a function required in the method. For example, the first communication apparatus is a terminal device; a chip that is disposed in a terminal device and that is configured to implement a function of the terminal device; or another component configured to implement a function of a terminal device. In the following description process, an example in which the first communication apparatus is the terminal device is used for description.

The method includes: The terminal device determines capability information, and sends the capability information to an access network device, where the capability information indicates a multicast service receiving capability corresponding to a band, and/or a multicast service receiving capability corresponding to a component carrier (CC).

In this embodiment of this application, the terminal device may indicate a multicast capability at a band (or referred to as a frequency band) level and/or a CC level by using the capability information, so that multicast capability reporting accuracy is improved, and the access network device can obtain the refined capability information. In a possible implementation, the access network device may provide a multicast service and/or a unicast service based on the refined capability information, for example, may configure or select a communication parameter for the multicast service and/or the unicast service based on the refined capability information.

In a possible design, that the capability information indicates a multicast service receiving capability corresponding to a band, and/or a multicast service receiving capability corresponding to a component carrier CC includes: The capability information includes band combination information, where the band combination information indicates the multicast service receiving capability corresponding to the band, and/or the multicast service receiving capability corresponding to the component carrier CC. In this manner, the terminal device can report a band-level or CC-level multicast capability in a band combination, to improve the multicast capability reporting accuracy.

In a possible design, that the capability information indicates a multicast service receiving capability corresponding to a band, and/or a multicast service receiving capability corresponding to a component carrier CC includes: The capability information includes a first band combination list and an identifier of a first feature set combination, where the first band combination list includes first band information, the first band information includes identifiers of N bands that support reception of a multicast service, and N is an integer greater than 0; and the first feature set combination includes at least one first parameter set corresponding to the first band combination list, where any first parameter set indicates a multicast service receiving capability corresponding to each of the N bands, and/or a multicast service receiving capability corresponding to a CC on each of the N bands.

In the foregoing manner, the identifiers of the N bands that support reception of a multicast service are listed in the band combination list, and the multicast service receiving capability corresponding to each of the N bands in the band combination is indicated in the feature set combination, to improve the multicast capability accuracy, and help the access network device schedule a multicast service and/or a unicast service for the terminal device.

In a possible design, the first band combination list further includes second band information, where the second band information includes identifiers of M bands that support a unicast service, and M is an integer greater than 0; and any first parameter set further indicates a unicast service receiving capability corresponding to each of the M bands; or any first parameter set further indicates a communication service receiving capability corresponding to each of the M bands, where a communication service includes a unicast service and a multicast service. In the foregoing design, the unicast service receiving capabilities on the M bands in the band combination can be reported, to help the access network device obtain a refined terminal device capability, and help the access network device better provide a multicast service and/or a unicast service for the terminal device.

In a possible design, that the capability information indicates a multicast service receiving capability corresponding to a band, and/or a multicast service receiving capability corresponding to a component carrier CC includes: The capability information includes a second band combination list and an identifier of a second feature set combination, where the second band combination list includes identifiers of N bands that support reception of a multicast service, and N is an integer greater than 0; and the second feature set combination includes Q1 groups of parameters corresponding to the second band combination list, where each group of parameters includes Q2 second parameter sets, and any second parameter set indicates a multicast service receiving capability corresponding to each of the N bands, and/or a multicast service receiving capability corresponding to a CC on each of the N bands, where Q1 is an integer greater than 0, and Q2 is an integer greater than 0.

In the foregoing design, a band combination list is extended (namely, the second band combination list), to indicate the N bands that support reception of a multicast service, and the multicast capabilities corresponding to the N bands are indicated in the feature set combination, to improve the multicast capability reporting accuracy, so that the access network device can obtain the refined capability information. A possible implementation helps the access network device schedule a multicast service or a unicast service for the terminal device. In addition, the multicast capabilities and unicast capabilities that correspond to the N bands are distinguished, so that the unicast capability and the multicast capability may indicate, in a combination manner, a communication capability of the terminal device in a band combination. In comparison with a manner in which all the multicast capabilities and/or the unicast capabilities supported in the band combination are sequentially indicated in an exhaustive manner, unnecessary capability information reporting can be reduced, to reduce signaling overheads.

In a possible design, the capability information further includes a third band combination list, where the third band combination list includes identifiers of M bands that support reception of a unicast service, and M is an integer greater than 0; and the second feature set combination further includes Q2 third parameter sets corresponding to the third band combination list, and any third parameter set indicates a unicast service receiving capability corresponding to each of the M bands, where second parameter set i in the Q2 second parameter sets corresponds to first parameter set i in any group of the Q1 groups of parameters, and i is an integer greater than 0 and not greater than Q2.

In the foregoing design, the multicast capabilities and the unicast capabilities that correspond to the N bands are distinguished, so that the unicast capability and the multicast capability may indicate, in a combination manner, a communication capability of the terminal device in a band combination. In comparison with an exhaustive manner, signaling overheads can be reduced. In addition, for the indication of the unicast capability part, an existing mechanism can be reused to the greatest extent, and modifications to a protocol can be reduced.

In a possible design, that the capability information indicates a multicast service receiving capability corresponding to a band, and/or a multicast service receiving capability corresponding to a component carrier CC includes: The capability information includes a second band combination list and identifiers of Q1 third feature set combinations, where the second band combination list includes identifiers of N bands that support reception of a multicast service, and N is an integer greater than 0; and any third feature set combination includes Q2 fourth parameter sets, and any fourth parameter set indicates a multicast service receiving capability corresponding to each of the N bands, and/or a multicast service receiving capability corresponding to a CC on each of the N bands, where Q1 is an integer greater than 0, and Q2 is an integer greater than 0.

In the foregoing design, a band combination list is extended (namely, the second band combination list), to indicate the N bands that support reception of a multicast service, and feature set combinations corresponding to the N bands that support reception of a multicast service are extended (namely, the Q1 third feature set combinations), to improve the multicast capability reporting accuracy, so that the access network device can obtain the refined capability information. A possible implementation helps the access network device schedule a multicast service or a unicast service for the terminal device.

In addition, the multicast capabilities and unicast capabilities that correspond to the N bands are distinguished, so that the unicast capability and the multicast capability may indicate, in a combination manner, a communication capability of the terminal device in a band combination. In comparison with a manner in which all the multicast capabilities and/or the unicast capabilities supported in the band combination are sequentially indicated in an exhaustive manner, unnecessary capability information reporting can be reduced, to reduce signaling overheads.

In a possible design, the capability information further includes a third band combination list and an identifier of a fourth feature set combination, where the third band combination includes identifiers of M bands that support reception of a unicast service, and M is an integer greater than 0; and the fourth feature set combination includes Q2 fifth parameter sets, and any fifth parameter set indicates a unicast service receiving capability corresponding to each of the M bands.

In the foregoing design, capability reporting signaling overheads can be reduced by combining the identifier of the fourth feature set combination and the identifier of the third feature set combination. In addition, for the indication of the unicast capability part, an existing mechanism can be reused to the greatest extent, and a protocol is slightly modified.

In a possible design, the capability information includes a fourth band combination list and an identifier of a fifth feature set combination, where the fourth band combination list includes identifiers of X bands supported by the terminal device, and X is an integer greater than 0; and the fifth feature set combination includes at least one sixth parameter set, any sixth parameter set indicates a communication parameter corresponding to each of the X bands, the X bands include N bands that support reception of a multicast service, and a communication parameter corresponding to any one of the N bands indicates a multicast service receiving capability corresponding to the band, and/or a communication capability corresponding to a CC on the band, where if the CC supports reception of a multicast service, the communication capability corresponding to the CC is a multicast service receiving capability corresponding to the CC, and N is an integer greater than 0 and not greater than X.

In the foregoing design, a communication parameter corresponding to a feature set index indicates a multicast service receiving capability, so that the capability reporting signaling overheads can be reduced. In addition, for the indication of the unicast capability part, an existing mechanism can be reused to the greatest extent, and a protocol is slightly modified.

In a possible design, that any sixth parameter set indicates a communication parameter corresponding to each of the X bands includes: Any sixth parameter set includes an index of the communication parameter corresponding to each of the X bands. An index of a communication parameter for any one of the X bands satisfies: If the band supports reception of a multicast service, the index of the communication parameter corresponding to the band belongs to a first index set; and if the band does not support reception of a multicast service, the index of the communication parameter corresponding to the band belongs to a second index set.

In the foregoing design, the index sets are divided, so that the access network device can determine, based on the index corresponding to the band, whether the band supports reception of a multicast service. In comparison with a manner in which a flag indicating whether reception of a multicast service is supported is explicitly carried in the communication parameter corresponding to the band, signaling overheads and protocol complexity can be reduced, and compatibility with an earlier version protocol can further be improved.

In a possible design, that a communication parameter corresponding to any one of the N bands indicates a communication capability corresponding to a CC on the band includes: The communication parameter corresponding to any one of the N bands includes an index of the communication capability corresponding to the CC on the band, and an index of a communication capability corresponding to any CC on the band satisfies: if the CC supports reception of a multicast service, the index of the communication capability corresponding to the CC belongs to a third index set; and if the CC does not support reception of a multicast service, the index of the communication capability corresponding to the CC belongs to a fourth index set.

In the foregoing design, the index sets are divided, so that the access network device can determine, based on the index corresponding to the CC, whether the CC supports reception of a multicast service. In comparison with a manner in which a flag indicating reception of a multicast service is explicitly carried in the communication parameter corresponding to the CC, signaling overheads and protocol complexity can be reduced, and compatibility with a device supporting an earlier version protocol can further be improved.

In a possible design, the multicast service receiving capability corresponding to the band includes at least one of the following: the band supports reception of a multicast service, or a communication parameter for receiving the multicast service on the band.

In a possible design, the multicast service receiving capability corresponding to the CC includes: The CC supports reception of a multicast service, and/or communication information for receiving the multicast service on the CC, where the communication information is a communication parameter for receiving the multicast service on the CC, or the communication information is a capability value of the CC, and the capability value is determined based on the communication parameter for receiving the multicast service on the CC.

In a possible design, the communication parameter for receiving the multicast service includes a highest modulation order supported during reception of a multicast service.

In a possible design, the communication parameter for receiving the multicast service further includes: whether simultaneous reception of a unicast service and a multicast service is supported in a case of synchronization, and/or whether simultaneous reception of a unicast service and a multicast service is supported in a case of unsynchronization.

In a possible design, the method further includes: sending indication information to the access network device, where the indication information indicates a modulation order for a multicast service that terminal device is receiving or expects to receive. In this design, the access network device may learn, based on the indication information, related information of the multicast service that the terminal device is receiving or expects to receive, so that the terminal device better schedules a multicast service and/or a unicast service.

In a possible design, before the sending indication information to the access network device, the method further includes: receiving fourth information from the access network device, where the fourth information indicates to report information about an inter-public land mobile network (PLMN) received multicast service, an inter-operator received multicast service, an inter-base station received multicast service, a non-serving cell received multicast service, or an inter-frequency received multicast service.

In a possible design, before the sending indication information to the access network device, the method further includes:

when either of the following cases is satisfied, determining that the indication information needs to be reported:

a PLMN in a TMGI of the received multicast service is inconsistent with the PLMN included in the system information block (SIB) 1 of the serving cell of the access network device; or a PLMN included in a SIB 1 of a cell in which the multicast service is received is inconsistent with the PLMN included in the SIB 1 of the serving cell of the access network device.

In a possible design, the fourth information includes information about one or more PLMNs, and before the sending indication information to the access network device, the method further includes:

when either of the following cases is satisfied, determining that the indication information needs to be reported:

a PLMN in a TMGI of the received multicast service is different from the one or more PLMNs; or a PLMN included in a SIB 1 of a cell in which the multicast service is received is different from the one or more PLMNs.

In a possible design, before the sending indication information to the access network device, the method further includes:

when one or both of the following cases are satisfied, determining that the indication information needs to be reported:

a frequency for receiving the multicast service is not a frequency included in a SIB 21 of the serving cell of the access network device; and the frequency for receiving the multicast service is different from a frequency in a frequency list included in user service description (USD).

In a possible design, the fourth information includes information about one or more frequencies, and before the sending indication information to the access network device, the method further includes:

when the following case is satisfied, determining that the indication information needs to be reported: a frequency for receiving the multicast service is different from the one or more frequencies.

In a possible design, before the sending indication information to the access network device, the method further includes: receiving a SIB 21 from the access network device.

In a possible design, the indication information further indicates at least one of the following information of the multicast service that the terminal device is receiving or expects to receive: frequency information, the temporary mobile group identity (TMGI), and a subcarrier spacing (SCS).

In a possible design, before the capability information is determined, the method further includes: receiving capability reporting indication information from the access network device, where the capability reporting indication information indicates the terminal device to report a multicast service receiving capability. In this design, the terminal device may report the multicast capability based on the indication of the access network device, so that the terminal device can avoid unnecessary capability information reporting of the terminal device. In addition, the access network device can flexibly control, by using the indication information, the multicast service receiving capability of the terminal device.

According to a second aspect, this application provides a communication method. The method may be performed by a second communication apparatus. The second communication apparatus may be a communication device; or may be a communication apparatus, for example, a chip, that can support a communication device in implementing a function required in the method. For example, the second communication apparatus is a network device (for example, a base station); a chip that is disposed in a network device and that is configured to implement a function of the network device; or another component configured to implement a function of a network device. In the following description process, an example in which the second communication apparatus is the network device is used for description.

The method includes: receiving capability information from a terminal device, where the capability information indicates a multicast service receiving capability corresponding to a band, and/or a multicast service receiving capability corresponding to a CC; and determining a capability of the terminal device based on the capability information.

In a possible design, that the capability information indicates a multicast service receiving capability corresponding to a band, and/or a multicast service receiving capability corresponding to a component carrier CC includes: The capability information includes band combination information, where the band combination information indicates the multicast service receiving capability corresponding to the band, and/or the multicast service receiving capability corresponding to the component carrier CC. In this manner, the terminal device can report a band-level or CC-level multicast capability in a band combination, to improve multicast capability reporting accuracy.

In a possible design, that the capability information indicates a multicast service receiving capability corresponding to a band, and/or a multicast service receiving capability corresponding to a component carrier CC includes: The capability information includes a first band combination list and an identifier of a first feature set combination, where the first band combination list includes first band information, the first band information includes identifiers of N bands that support reception of a multicast service, and N is an integer greater than 0; and the first feature set combination includes at least one first parameter set corresponding to the first band combination list, where any first parameter set indicates a multicast service receiving capability corresponding to each of the N bands, and/or a multicast service receiving capability corresponding to a CC on each of the N bands.

In a possible design, the first band combination list further includes second band information, where the second band information includes identifiers of M bands that support a unicast service, and M is an integer greater than 0; and any first parameter set further indicates a unicast service receiving capability corresponding to each of the M bands; or any first parameter set further indicates a communication service receiving capability corresponding to each of the M bands, where a communication service includes a unicast service and a multicast service. In the foregoing design, the unicast service receiving capabilities on the M bands in a band combination may be reported, to help the access network device accurately learn the capability of the terminal device, and help the access network device schedule the multicast service or the unicast service for the terminal device.

In a possible design, that the capability information indicates a multicast service receiving capability corresponding to a band, and/or a multicast service receiving capability corresponding to a component carrier CC includes: The capability information includes a second band combination list and an identifier of a second feature set combination, where the second band combination list includes identifiers of N bands that support reception of a multicast service, and N is an integer greater than 0; and the second feature set combination includes Q1 groups of parameters corresponding to the second band combination list, where each group of parameters includes Q2 second parameter sets, and any second parameter set indicates a multicast service receiving capability corresponding to each of the N bands, and/or a multicast service receiving capability corresponding to a CC on each of the N bands, where Q1 is an integer greater than 0, and Q2 is an integer greater than 0.

In a possible design, the capability information further includes a third band combination list, where the third band combination list includes identifiers of M bands that support reception of a unicast service, and M is an integer greater than 0; and the second feature set combination further includes Q2 third parameter sets corresponding to the third band combination list, and any third parameter set indicates a unicast service receiving capability corresponding to each of the M bands, where second parameter set i in the Q2 second parameter sets corresponds to first parameter set i in any group of the Q1 groups of parameters, and i is an integer greater than 0 and not greater than Q2.

In the foregoing design, the multicast capabilities and the unicast capabilities that correspond to the N bands are distinguished, so that the unicast capability and the multicast capability may indicate, in a combination manner, a communication capability of the terminal device in a band combination. In comparison with an exhaustive manner, signaling overheads can be reduced. In addition, for the unicast capability part, an existing mechanism can be reused to the greatest extent, and a protocol is slightly modified.

In a possible design, that the capability information indicates a multicast service receiving capability corresponding to a band, and/or a multicast service receiving capability corresponding to a component carrier CC includes: The capability information includes a second band combination list and identifiers of Q1 third feature set combinations, where the second band combination list includes identifiers of N bands that support reception of a multicast service, and N is an integer greater than 0; and any third feature set combination includes Q2 fourth parameter sets, and any fourth parameter set indicates a multicast service receiving capability corresponding to each of the N bands, and/or a multicast service receiving capability corresponding to a CC on each of the N bands, where Q1 is an integer greater than 0, and Q2 is an integer greater than 0.

In a possible design, the capability information further includes a third band combination list and an identifier of a fourth feature set combination, where the third band combination includes identifiers of M bands that support reception of a unicast service, and M is an integer greater than 0; and the fourth feature set combination includes Q2 fifth parameter sets, and any fifth parameter set indicates a unicast service receiving capability corresponding to each of the M bands.

In a possible design, the capability information includes a fourth band combination list and an identifier of a fifth feature set combination, where the fourth band combination list includes identifiers of X bands supported by the terminal device, and X is an integer greater than 0; and the fifth feature set combination includes at least one sixth parameter set, any sixth parameter set indicates a communication parameter corresponding to each of the X bands, the X bands include N bands that support reception of a multicast service, and a communication parameter corresponding to any one of the N bands indicates a multicast service receiving capability corresponding to the band, and/or a communication capability corresponding to a CC on the band, where if the CC supports reception of a multicast service, the communication capability corresponding to the CC is a multicast service receiving capability corresponding to the CC, and N is an integer greater than 0 and not greater than X.

In a possible design, that any sixth parameter set indicates a communication parameter corresponding to each of the X bands includes: Any sixth parameter set includes an index of the communication parameter corresponding to each of the X bands. An index of a communication parameter for any one of the X bands satisfies: If the band supports reception of a multicast service, the index of the communication parameter corresponding to the band belongs to a first index set; and if the band does not support reception of a multicast service, the index of the communication parameter corresponding to the band belongs to a second index set.

In the foregoing design, the index sets are divided, so that the access network device can determine, based on the index corresponding to the band, whether the band supports reception of a multicast service. In comparison with a manner in which a flag indicating reception of a multicast service is explicitly carried in the communication parameter corresponding to the band, signaling overheads and protocol complexity can be reduced, and compatibility with an earlier version protocol can further be improved.

In a possible design, that a communication parameter corresponding to any one of the N bands indicates a communication capability corresponding to a CC on the band includes: The communication parameter corresponding to any one of the N bands includes an index of the communication capability corresponding to the CC on the band, and an index of a communication capability corresponding to any CC on the band satisfies: if the CC supports reception of a multicast service, the index of the communication capability corresponding to the CC belongs to a third index set; and if the CC does not support reception of a multicast service, the index of the communication capability corresponding to the CC belongs to a fourth index set.

In the foregoing design, the index sets are divided, so that the access network device can determine, based on the index corresponding to the CC, whether the CC supports reception of a multicast service. In comparison with a manner in which a flag indicating reception of a multicast service is explicitly carried in the communication parameter corresponding to the CC, signaling overheads and protocol complexity can be reduced, and compatibility with an earlier version protocol can further be improved.

In a possible design, the multicast service receiving capability corresponding to the band includes at least one of the following: the band supports reception of a multicast service, or a communication parameter for receiving the multicast service on the band.

In a possible design, the multicast service receiving capability corresponding to the CC includes: The CC supports reception of a multicast service, and/or communication information for receiving the multicast service on the CC, where the communication information is a communication parameter for receiving the multicast service on the CC, or the communication information is a capability value of the CC, and the capability value is determined based on the communication parameter for receiving the multicast service on the CC.

In a possible design, the communication parameter for receiving the multicast service includes a highest modulation order supported during reception of a multicast service.

In a possible design, the communication parameter for receiving the multicast service further includes: whether simultaneous reception of a unicast service and a multicast service is supported in a case of synchronization, and/or whether simultaneous reception of a unicast service and a multicast service is supported in a case of unsynchronization.

In a possible design, the method further includes: receiving indication information from the terminal device, where the indication information includes a modulation order for a multicast service that the terminal device is receiving or expects to receive.

In a possible design, before the receiving indication information from the terminal device, the method further includes: sending fourth information to the terminal device, where the fourth information indicates to report an inter-PLMN received multicast service, an inter-operator received multicast service, an inter-base station received multicast service, a non-serving cell received multicast service, or an inter-frequency received multicast service.

In a possible design, before the receiving indication information from the terminal device, the method further includes: sending a SIB 21 to the terminal device.

In a possible design, the method further includes: determining, based on the indication information, a communication parameter for communicating with the terminal device. The foregoing design helps the access network device schedule the unicast service for the terminal device.

In a possible design, before the receiving capability information from the terminal device, the method further includes: sending capability reporting indication information to the terminal device, where the capability reporting indication information indicates the terminal device to report a multicast service receiving capability. Based on the foregoing description, the terminal device may report the multicast capability based on the indication of the access network device, so that unnecessary multicast capability reporting can be avoided.

In a possible design, the access network device may send a groupcast service to the terminal device based on the capability information.

In a possible design, after receiving the capability information, the access network device may configure an MBS radio bearer (MRB) of the groupcast service based on the capability information. For example, the access network device may configure an MRB by using a radio resource control (RRC) configuration message. The access network device sends the groupcast service after configuring the MRB.

In a possible design, the access network device may further receive indication information. The indication information indicates information about the multicast service that the terminal device is receiving or expects to receive, for example, one or more of information such as a session identifier (session ID), a used subcarrier spacing (SCS), a bandwidth (BW), and a frequency. The access network device may send the unicast service to the terminal device based on the capability information and the indication information that are reported by the terminal device.

For beneficial effects of the method shown in the second aspect and the possible designs of the second aspect, refer to the beneficial effects of the first aspect and the possible designs of the first aspect.

According to a third aspect, this application provides a communication method. The method may be performed by a terminal device; or may be performed by a chip, a circuit, or another component configured to implement a function of a terminal device. The method includes: determining first information and second information, where the first information indicates that a terminal device is interested in a multicast service, and the second information indicates the multicast service that the terminal device is interested in; and sending the first information and the second information, where the first information is sent before security activation, and the second information is sent after the security activation.

In this embodiment of this application, before the security activation, an access network device is indicated that the terminal device is interested in the multicast service, so that the access network device can configure, for the terminal device, a resource used for the multicast service, for example, a common frequency domain resource (CFR). Therefore, after a resource used for a unicast service is configured, the resource does not need to be reconfigured based on the multicast service. For example, after an initial bandwidth part (initial BWP) is configured, a bandwidth of the initial BWP does not need to be configured as a bandwidth of the CFR based on the multicast service. This manner can reduce signaling overheads, and help ensure continuity of the multicast service. In addition, information related to the multicast service that the terminal device is interested in is sent after the security activation, so that specific information of an MBS can be avoided from being transmitted in an insecure environment, to improve communication security.

In a possible design, the terminal device may send the first information before the security activation and send the second information after the security activation when at least one of the following conditions is satisfied:

- a cell/an access network device accessed by the terminal device is providing a multicast service;
- a cell/an access network device accessed by the terminal device is to provide a multicast service;
- a cell/an access network device accessed by the terminal device supports providing of a multicast service;
- the terminal device is receiving or expects to receive a multicast service in a currently accessed cell/access network device;
- a multicast service that the terminal device is receiving or expects to receive is being provided/to be provided/supported to be provided by a currently accessed cell/access network device;
- a cell currently accessed by the terminal device broadcasts a SIB used to provide multicast service information;
- a cell currently accessed by the terminal device broadcasts a first SIB, where the first SIB carries multicast control configuration information (MCCH);
- a bandwidth of a CFR of a multicast service provided by a cell currently accessed by the terminal device is different from a bandwidth of an initial BWP configured by using a system message;
- a bandwidth of a CFR of a multicast service provided by a cell currently accessed by the terminal device is greater than a bandwidth of an initial BWP configured by using a system message; or
- the terminal device receives third information from the access network device, where the third information indicates that the terminal device sends the first information before the security activation and sends the second information after the security activation. Optionally, the third information is carried in a broadcast message.

In a possible design, the second information includes a multicast service identifier, a multicast service identifier, or an internet protocol (IP) group address. In the foregoing design, the multicast service that the terminal device is interested in is indicated after the security activation, so that the specific information of the MBS can be avoided from being transmitted in an insecure environment, to improve the communication security.

In a possible design, the first information is an interested frequency list and/or a priority of the multicast service. In the foregoing design, the first information is implicitly indicated by using the interested frequency list and/or the priority of the multicast service, so that the signaling overheads can be reduced.

According to a fourth aspect, this application provides a communication method. The method may be performed by an access network device, or may be performed by a chip or a circuit. The method includes: receiving first information and second information, where the first information indicates that a terminal device is interested in a multicast service, the second information indicates the multicast service that the terminal device is interested in, the first information is received before security activation, and the second information is received after the security activation; and after the receiving first information, configuring an initial BWP for the terminal device based on the first information, for example, configuring a bandwidth of the initial BWP as a bandwidth of a CFR.

In a possible design, the second information includes a multicast service identifier, a multicast service identifier, or an IP group address. In the foregoing design, the multicast service that the terminal device is interested in is indicated after the security activation, so that specific information of an MBS can be avoided from being transmitted in an insecure environment, to improve communication security.

In a possible design, the access network device sends third information to the terminal device, where the third information indicates that the terminal device sends the first information before the security activation and sends the second information after the security activation. Optionally, the third information is carried in a broadcast message.

In a possible design, the first information is an interested frequency list and/or a priority of the multicast service. In the foregoing design, the first information is implicitly indicated by using the interested frequency list and/or the priority of the multicast service, so that signaling overheads can be reduced.

For beneficial effects of the method shown in the fourth aspect and the possible designs of the fourth aspect, refer to the beneficial effects of the third aspect and the possible designs of the third aspect.

According to a fifth aspect, this application provides a communication method. The method may be performed by an access network device, or may be performed by a chip or a circuit. The method includes: A first access network device indicates a correspondence to a second access network device, where the correspondence is a one-to-one correspondence between one or more PLMN index values and one or more PLMN values; the first access network device receives indication information from a terminal device, where the indication information indicates information about a multicast service that the terminal device is receiving or expects to receive, the indication information includes at least one PLMN index value, and the at least one PLMN index value belongs to the one or more PLMN index values; and the first access network sends the indication information to the second access network device.

In a possible design, the indication information indicates at least one of the following information of the multicast service that the terminal device is receiving or expects to receive: frequency information, a TMGI, an SCS, or a modulation order.

In a possible design, that a first access network device indicates a correspondence to a second access network device includes:

The first access network device sends PLMN identity information in a SIB 1 to the second access network device, where the PLMN identity information indicates the correspondence.

In a possible design, that a first access network device indicates a correspondence to a second access network device includes:

The first access network device sends an Xn interface setup message or an NG-RAN node configuration update message to the second access network device, where the Xn interface setup message or the NG-RAN node configuration update message includes information about at least one cell, and information about a first cell in the at least one cell indicates at least one PLMN of the first cell and a PLMN index value corresponding to each PLMN.

In a possible design, that a first access network device indicates a correspondence to a second access network device includes:

The first access network device sends an Xn interface setup message or an NG-RAN node configuration update message to the second access network device, where the Xn interface setup message or the NG-RAN node configuration update message includes information about at least one cell, information about cell n in the at least one cell indicates at least one PLMN and an offset of cell n, the offset is a total quantity of PLMNs from cell 1 to cell (n−1) in the at least one cell, and n is an integer greater than 0.

According to a sixth aspect, this application provides a communication method. The method may be performed by an access network device, or may be performed by a chip or a circuit. The method includes: A second access network device obtains a correspondence from a first access network device, where the correspondence is a one-to-one correspondence between one or more PLMN index values and one or more PLMN values; the second access network device receives indication information from the first access network device, where the indication information indicates information about a multicast service that a terminal device is receiving or expects to receive, and the indication information includes at least one PLMN index value; and the second access network determines, based on the correspondence, a PLMN value corresponding to the at least one PLMN index value.

In a possible design, the indication information indicates at least one of the following information of the multicast service that the terminal device is receiving or expects to receive: frequency information, a TMGI, an SCS, or a modulation order.

In a possible design, that a second access network device obtains a correspondence from a first access network device includes:

The second access network device receives PLMN identity information in a SIB 1 sent by the first access network device, where the PLMN identity information indicates the correspondence.

In a possible design, that a second access network device obtains a correspondence from a first access network device includes:

The second access network device receives an Xn interface setup message or an NG-RAN node configuration update message sent by the first access network device, where the Xn interface setup message or the NG-RAN node configuration update message includes information about at least one cell, and information about a first cell in the at least one cell indicates at least one PLMN value of the first cell and a PLMN index value corresponding to each PLMN.

In a possible design, that a second access network device obtains a correspondence from a first access network device includes:

The second access network device receives an Xn interface setup message or an NG-RAN node configuration update message sent by the first access network device, where the Xn interface setup message or the NG-RAN node configuration update message includes information about at least one cell, information about cell n in the at least one cell indicates at least one PLMN value and an offset of cell n, the offset is a total quantity of PLMNs from cell 1 to cell (n−1) in the at least one cell, and n is an integer greater than 0.

According to a seventh aspect, this application provides a communication method. The method may be performed by an access network device, or may be performed by a chip or a circuit. The method includes: A first access network device receives first indication information from a terminal device, where the first indication information indicates information about a multicast service that the terminal device is receiving or expects to receive, and the first indication information includes at least one PLMN index value; and the first access network device sends second indication information to a second access network device, where PLMN information in the second indication information is a PLMN value corresponding to the at least one PLMN index value.

In a possible design, the first indication information indicates at least one of the following information of the multicast service that the terminal device is receiving or expects to receive: frequency information, a TMGI, an SCS, or a modulation order.

In a possible design, the second indication information is obtained by replacing the at least one PLMN index value in the first indication information with the PLMN value corresponding to the at least one PLMN index value.

According to an eighth aspect, this application provides a communication method. The method may be performed by a terminal device, or may be performed by a chip or a circuit. The method includes: A terminal device receives service information from an access network device, where the service information includes a first TMGI, and the first TMGI includes a first PLMN index value; and the terminal device sends indication information to the access network device, where the indication information indicates information about a multicast service that the terminal device is receiving or expects to receive, the indication information includes a second TMGI, the second TMGI includes a PLMN value corresponding to the first PLMN index value, and service identifiers (service IDs) in the first TMGI and the second TMGI are the same.

In a possible design, the indication information indicates at least one of the following information of the multicast service that the terminal device is receiving or expects to receive: frequency information, a TMGI, an SCS, or a modulation order.

In a possible design, the second TMGI is a TMGI carried in an application layer message received by the terminal device.

In another possible design, the second TMG is generated by the terminal device based on the first TMGI and the PLMN value corresponding to the first PLMN index value.

According to a ninth aspect, this application further provides a communication apparatus. The communication apparatus implements any method provided in the first aspect, the third aspect, or the eighth aspect. The communication apparatus may be implemented by hardware, or may be implemented by hardware executing corresponding software. The hardware or the software includes one or more units or modules corresponding to the foregoing function.

In a possible design, the communication apparatus includes a processor. The processor is configured to support the communication apparatus in performing a corresponding function of the terminal device in the foregoing method. The communication apparatus may further include a memory. The memory may be coupled to the processor, and store program instructions and data that are necessary for the communication apparatus. Optionally, the communication apparatus further includes an interface circuit. The interface circuit is configured to support communication between the communication apparatus and a device such as an access network device.

In a possible design, the communication apparatus includes corresponding functional modules, separately configured to implement the steps in the foregoing method. The function may be implemented by hardware, or may be implemented by executing corresponding software by hardware. The hardware or software includes one or more modules corresponding to the foregoing function.

In a possible design, a structure of the communication apparatus includes a processing module and a communication module. The modules may perform corresponding functions in the foregoing method example. For details, refer to the description in the method provided in the first aspect or the third aspect. Details are not described herein again.

According to a tenth aspect, this application further provides a communication apparatus. The communication apparatus implements any method provided in the second aspect, the fourth aspect, the fifth aspect, the sixth aspect, or the seventh aspect. The communication apparatus may be implemented by hardware, or may be implemented by hardware executing corresponding software. The hardware or the software includes one or more units or modules corresponding to the foregoing function.

In a possible design, the communication apparatus includes a processor. The processor is configured to support the communication apparatus in performing a corresponding function of the access network device in the foregoing method. The communication apparatus may further include a memory. The memory may be coupled to the processor, and store program instructions and data that are necessary for the communication apparatus. Optionally, the communication apparatus further includes an interface circuit. The interface circuit is configured to support communication between the communication apparatus and a device such as a terminal device.

In a possible design, the communication apparatus includes corresponding functional modules, separately configured to implement the steps in the foregoing method. The function may be implemented by hardware, or may be implemented by executing corresponding software by hardware. The hardware or software includes one or more modules corresponding to the foregoing function.

In a possible design, a structure of the communication apparatus includes a processing module and a communication module. The modules may perform corresponding functions in the foregoing method example. For details, refer to the description in the method provided in the second aspect or the fourth aspect. Details are not described herein.

According to an eleventh aspect, a communication apparatus is provided. The communication apparatus includes a processor and an interface circuit. The interface circuit is configured to: receive a signal from another communication apparatus different from the communication apparatus and transmit the signal to the processor, or send a signal from the processor to another communication apparatus different from the communication apparatus. The processor is configured to implement the method in any one of the first aspect, the third aspect, or the eighth aspect and the possible designs by using a logic circuit or executing code instructions.

According to a twelfth aspect, a communication apparatus is provided. The communication apparatus includes a processor and an interface circuit. The interface circuit is configured to: receive a signal from another communication apparatus different from the communication apparatus and transmit the signal to the processor, or send a signal from the processor to another communication apparatus different from the communication apparatus. The processor is configured to implement the method in any one of the second aspect, the fourth aspect, the fifth aspect, the sixth aspect, or the seventh aspect and the possible designs by using a logic circuit or executing code instructions.

According to a thirteenth aspect, a computer-readable storage medium is provided. The computer-readable storage medium stores a computer program or instructions. When the computer program or the instructions is/are executed by a processor, the method in any one of the first aspect to the eighth aspect and the possible designs is implemented.

According to a fourteenth aspect, a computer program product storing instructions is provided. When the instructions are run by a processor, the method in any one of the first aspect to the eighth aspect and the possible designs is implemented.

According to a fifteenth aspect, a chip system is provided. The chip system includes a processor, and may further include a memory, to implement the method in any one of the first aspect to the eighth aspect and the possible designs. The chip system may include a chip; or may include a chip and another discrete component.

According to a sixteenth aspect, a communication system is provided. The system includes the apparatus (for example, the terminal device) according to the first aspect and the apparatus (for example, the access network device) according to the second aspect. Alternatively, the system includes the apparatus (for example, the terminal device) according to the third aspect and the apparatus (for example, the access network device) according to the fourth aspect. Alternatively, the system includes the apparatus (for example, the first access network device) according to the fifth aspect and the apparatus (for example, the second access network device) according to the sixth aspect. Alternatively, the system includes the apparatus (for example, the first access network device) according to the seventh aspect and a second access network device. Alternatively, the system includes the apparatus (for example, the terminal device) according to the eighth aspect and an access network device.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment.

In the following description, some terms in embodiments of this application are described, to help a person skilled in the art have a better understanding.

Figure 1:
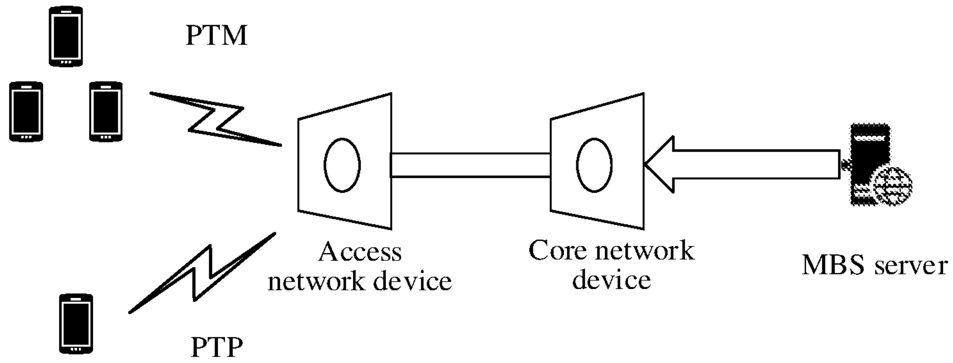
FIG. 1 is a schematic diagram of a multicast service according to an embodiment of this application.

(1) MBS: The MBS is a service that is simultaneously transmitted to a plurality of terminal devices, for example, a live broadcast service, a public security service, or a batch software update service. A multicast service may include one or more of a groupcast service and a broadcast service. The multicast service may also be referred to as a groupcast service, a broadcast service, a groupcast/broadcast service, a groupcast/multicast service, a multicast/broadcast service, or the like. The MBS is from a data server. First, the data server sends data of the MBS to a core network device, then the core network device sends the data of the MBS to an access network device, and finally the access network device sends the data of the MBS to at least one terminal device that receives the MBS. When the core network device sends the data of the MBS to the access network device, the data of the MBS is transmitted over a common transmission channel, namely, an MBS session. However, when the access network device sends the data of the MBS to the terminal device, there are two transmission manners: A first manner may be a point to multi-point (PTM) transmission manner, and a second manner may be a point to point (PTP) transmission manner, which are shown in FIG. 1.

In embodiments of this application, the MBS may also be referred to as an "MBS service", an "MBS broadcast service", an "MBS session", an "MBS broadcast business", an "MBS business", or the like.

Figure 2:
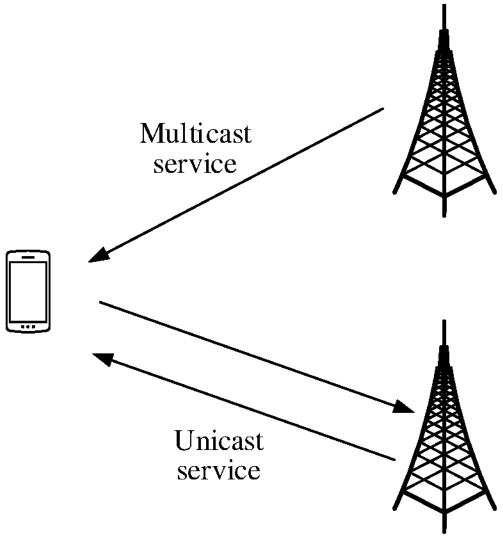
FIG. 2 is a schematic diagram of a multicast scenario according to an embodiment of this application.

One terminal device supports reception of an MBS service from one access network device and reception of a unicast service from another access network device, as shown in FIG. 2. Alternatively, one terminal device may receive an MBS service and a unicast service from one access network device.

It should be noted that the MBS is merely an example name of a multicast service, and names of the multicast service may be different in different communication standards. For example, the multicast service in long term evolution (LTE) may be referred to as a multimedia broadcast multicast service (MBMS), and the multicast service in new radio (NR) may be referred to as an MBS. In future communication development, the multicast service may also be referred to as another name, which is not specifically limited in this application, and is collectively referred to as a multicast service below.

(2) Receive only mode (ROM) is a mode in which a terminal device is allowed to receive only a multicast broadcast service without accessing a public land mobile network (PLMN) that provides the multicast broadcast service and registering with the PLMN.

(3) Terminal device capability reporting

A network device obtains capability information of a terminal device in a capability query process. In the capability query process, the network device sends indication information to the terminal device, where the indication information indicates a capability parameter that needs to be reported by the terminal device. The terminal device uploads the corresponding capability information based on the indication of the indication information.

Currently, there is a terminal device that has a multi-radio access technology (RAT) capability, and the multi-RAT capability is a capability that the terminal device simultaneously works in a plurality of RATs. A typical representation of the multi-RAT capability is an evolved universal terrestrial radio access new radio dual connectivity (EN-DC) mode. EN-DC is a manner in which LTE and NR work together in a dual-connectivity mode, and an LTE base station is a master node. To be specific, one terminal device is connected to both an LTE network device and an NR network device, and the two network devices simultaneously serve the terminal device. The multi-RAT capability is also requested as a capability type when a capability is requested.

Capability structure of a terminal device in NR: Due to different hardware or software versions, different terminal devices support different capabilities in one RAT. To better serve the terminal device, a network needs to learn of a capability of the terminal device, so as to configure an appropriate working mode for the terminal device.

The capability structure of the terminal device in NR includes band combination information (a band combination list) and band information.

The band combination information includes a band list and a feature set combination.

The band list includes a band combination supported by the terminal device, and indicates bands, for example, a band 1+a band 2+a band 3, specifically included in the band combination. Certainly, even if only one band is supported, reporting is performed by using this structure.

Figure 3:
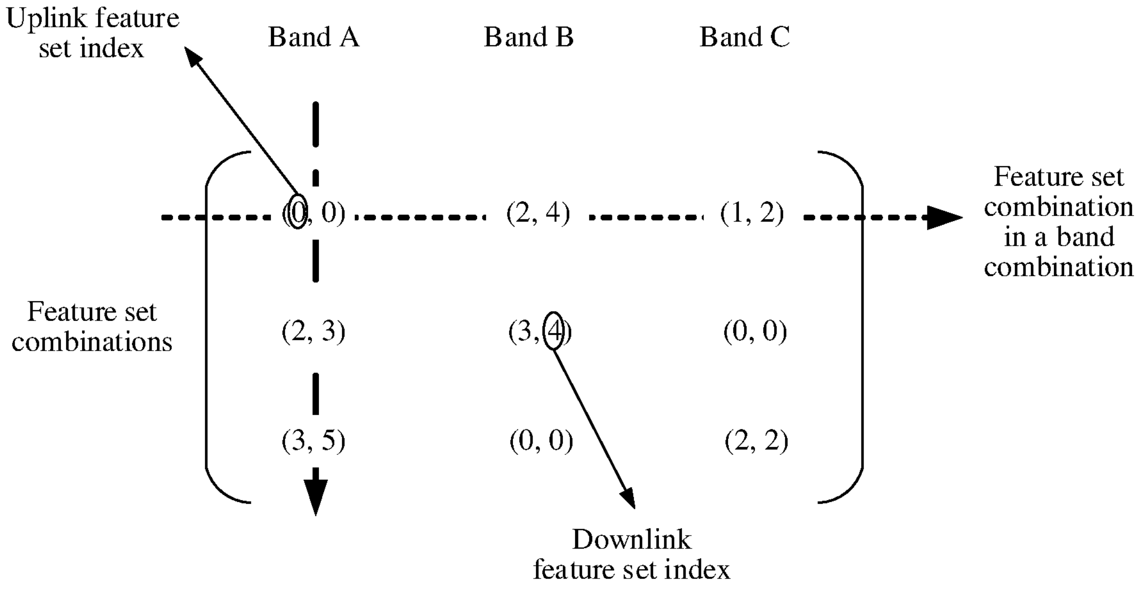
FIG. 3 is a schematic diagram of a feature set combination according to an embodiment of this application.

The feature set combination indicates a capability supported by the terminal device in a band combination. The feature set combination is a set including a plurality of feature sets. Each feature set combination includes matrix elements of a plurality of feature set indexes (feature set IDs). Each feature set ID is associated with one band. For example, FIG. 3 shows feature set combinations associated with a band combination including a band A, a band B, and a band C. Each row corresponds to an uplink feature set ID and a downlink feature set ID used for each of the band A, the band B, and the band C. Different rows indicate different feature set combinations supported by a UE in the band combination. The first row is used as an example. Matrix elements of different feature sets supported by the UE in the combination including the band A, the band B, and the band C are respectively (0, 0), (2, 4), and (1, 2). It may be understood that the matrix element (0, 0) indicates that both an uplink feature set index and a downlink feature set index that are used on the band A are 0, the matrix element (2, 4) indicates that an uplink feature set index and a downlink feature set index that are used on the band B are respectively 2 and 4, and the rest can be deduced by analogy.

The feature set ID corresponds to a group of communication parameters, and indicates a capability supported by the terminal device on the band, for example, a quantity of carriers, a carrier bandwidth, and a multiple-input multiple-output (MIMO) technology capability. The communication parameter corresponding to the feature set ID may include a capability supported by the terminal device on the entire band, and a capability supported on each CC (feature set per CC) of the band.

The band information may include a band list (Band List). The band list includes a band supported by the terminal device and a capability supported by the terminal device on each band.

Figure 4:
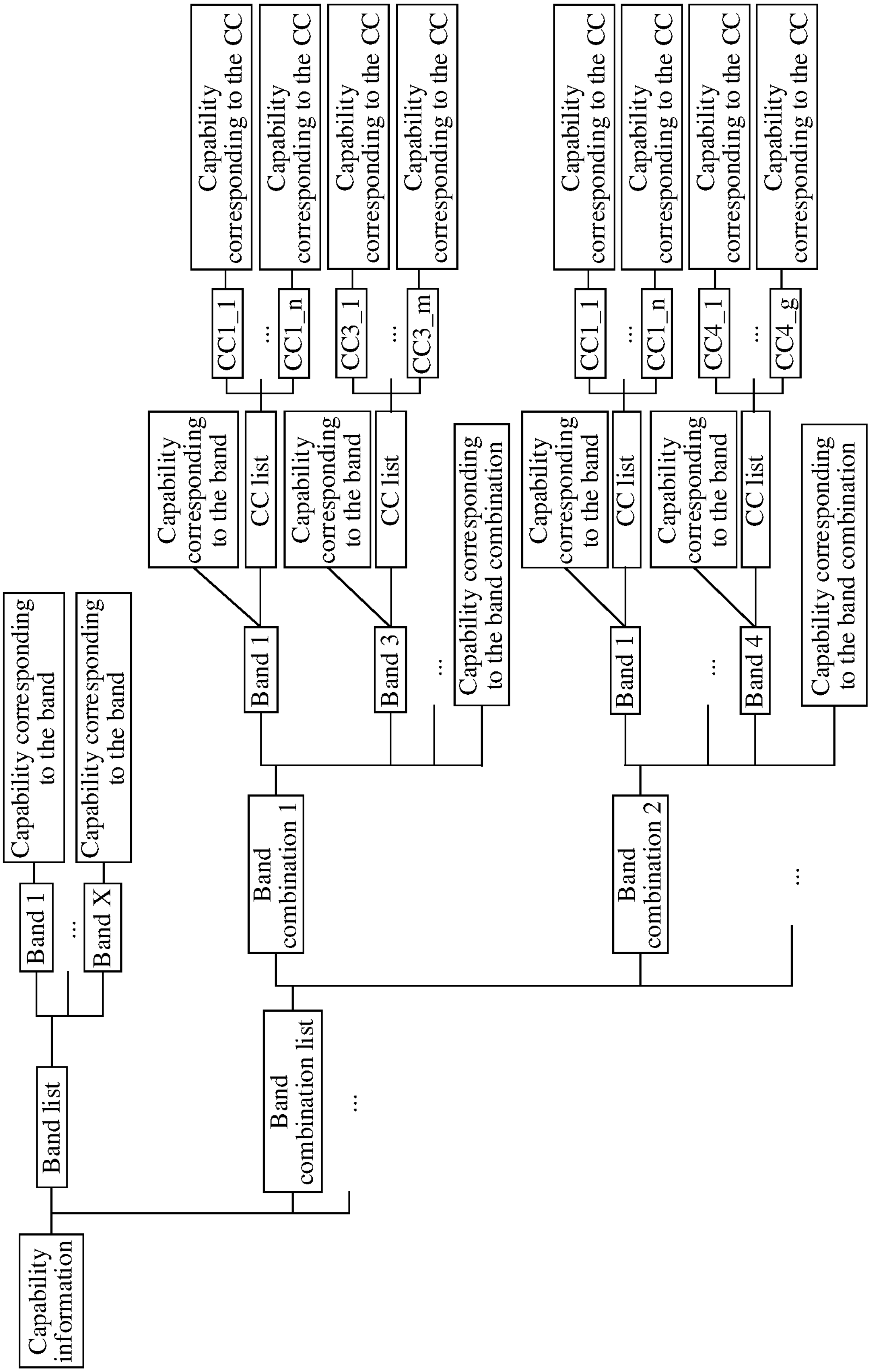
FIG. 4 is a schematic diagram of a structure of capability information according to an embodiment of this application.

For example, the capability structure of the terminal device may be shown in FIG. 4.

It should be understood that the capability structure of the terminal device may further include other information that is not shown, for example, terminal device-level capability information. This is not specifically limited herein.

(4) Terminal device capability query process

Unicast communication is performed between a network device and a terminal device. Therefore, the network device usually obtains a capability of the terminal device in a capability query process, so that the network device sends and receives data in a unicast manner based on the capability of the terminal device. In the capability query process, the network device may send capability query information to the terminal device, to request the capability of the terminal device.

The capability query information usually includes an information element, and the information element includes a plurality of fields indicating the capability that is of the terminal device and that needs to be requested. The information element of the capability query information sent by the network device may be a filter function, for example, UE-Capability Request Filter Common. The filter function is used to filter the requested capability of the terminal device. A filtered capability of the terminal device is a capability that is of the terminal device and that satisfies a requirement of the network device. Therefore, the network device may obtain, by using the filter function, the capability that is of the terminal device and that is reported, through an indication of the network device, by the terminal device.

(5) A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device with a wireless connection function or a processing device connected to a wireless modem. The terminal device may communicate with a core network through a radio access network, and exchange a voice or data with the RAN, or exchange a voice and data with the RAN. The terminal device may include a UE, a wireless terminal device, a mobile terminal device, a device-to-device communication (D2D) terminal device, a vehicle to everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal device is a device such as a personal communication service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a generic term for wearable devices, such as glasses, gloves, watches, clothes, and shoes, that are developed by applying wearable technologies to intelligently designs of daily wear. The wearable device is a portable device that is directly worn or integrated into clothes or an accessory of a user. The wearable device is not merely a hardware device, but also implements a powerful function through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones.

In embodiments of this application, the terminal device may further include a relay (relay). Alternatively, it may be understood that any device that can perform data communication with a base station may be considered as a terminal device.

In embodiments of this application, an apparatus configured to implement a function of a terminal device may be a terminal device; or may be an apparatus, for example, a part or a component having a communication function, or a chip system that is in the terminal device and that can support the terminal device in implementing the function. The apparatus may be mounted in the terminal device. In embodiments of this application, the chip system may include a chip; or may include a chip and another discrete component. In the technical solutions provided in embodiments of this application, an example in which an apparatus configured to implement a function of a terminal device is a terminal device is used to describe the technical solutions provided in embodiments of this application.

(6) A network device includes, for example, an access network (access network, AN) device, for example, a base station (for example, an access point), and may be a device that is in an access network and that communicates with a terminal device over an air interface through one or more cells. For example, the network device may include an evolved NodeB (NodeB, eNB, or e-NodeB, evolved NodeB) in an LTE system or a long term evolution-advanced (long term evolution-advanced, LTE-A) system, may include a next generation NodeB (next generation NodeB, gNB) in a 5th generation mobile communication technology (5th generation, 5G) NR system (also referred to as an NR system for short), or may include a central unit (central unit, CU) and/or a distributed unit (distributed unit, DU) in a cloud access network (cloud radio access network, Cloud RAN) system. This is not limited in embodiments of this application. For example, the network device may be a CU, a DU, or a whole of the CU and the DU in a cloud RAN system.

The network device may further include a core network device, and the core network device includes, for example, an access and mobility management function (access and mobility management function, AMF). Because embodiments of this application mainly relate to an access network, the network device is an access network device in the following description unless otherwise specified.

In embodiments of this application, an apparatus configured to implement a function of the network device may be a network device, or may be an apparatus, for example, a chip system, that can support the network device in implementing the function. The apparatus may be installed in the network device. In the technical solutions provided in embodiments of this application, an example in which the apparatus configured to implement the function of the network device is the network device is used to describe the technical solutions provided in embodiments of this application.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. At least one of the following items (pieces) or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Unless otherwise stated on the contrary, ordinal terms such as "first" and "second" mentioned in embodiments of this application are used to distinguish between a plurality of objects, and are not intended to limit sizes, content, a sequence, a time sequence, priorities, importance degrees, or the like of the plurality of objects. For example, a first parameter and a second parameter are merely used to distinguish between different parameters, and do not indicate different content, different values, different priorities, different importance degrees, or the like of the two parameters.

The foregoing describes some noun concepts used in embodiments of this application. The following describes technical features in embodiments of this application.

In a mobile communication system, communication between a terminal device and a network device is performed on a band. Different terminal devices may support different bands or different band combinations, and the terminal devices may have different baseband capabilities on different bands or in band combinations. The baseband capability may include: a carrier bandwidth, a quantity of carriers, a quantity of supported channel state indicator (CSI) processes, a quantity of multiple-input multiple-output (MIMO) layers, and the like. The terminal device needs to report the supported band or band combination and information about the baseband capability to the network device. The network device performs resource configuration for a service based on the capability of the terminal device.

In a scenario, a terminal device may further receive a broadcast multicast service when performing a unicast operation. In this case, a unicast service and the broadcast multicast service share a baseband capability of the terminal device. Therefore, it is necessary for the terminal device to report, to a network device, a capability of receiving multicast broadcast when the terminal device performs a unicast operation, so that the network device configures a multicast broadcast service based on capability information reported by the terminal device. Currently, in LTE, a manner in which a terminal device reports a multicast broadcast receiving capability is: reporting mbms-MaxBW in capability information, where mbms-MaxBW indicates a maximum bandwidth supported for MBS reception.

Currently, multicast capability information designed in LTE is at a UE level, and a band and a carrier are not distinguished. Only a maximum bandwidth used for an MBS can be reported. An existing NR multicast service may be supported only on a band of a UE. If an LTE multicast capability is reused, a multicast capability of the NR UE cannot be accurately reported.

Based on this, embodiments of this application provide a communication method and apparatus, to resolve a problem that a multicast capability reporting accuracy of a terminal device is low. The method and the apparatus are based on a same inventive concept. Because the method and the apparatus have a similar problem-resolving principle, for implementations of the apparatus and the method, refer to each other, and no repeated description is provided.

The communication method provided in this application may be applied to various communication systems, for example, an internet of things (IoT), a narrow band internet of things (NB-IoT), long term evolution (long term evolution, LTE), a 5th generation (5G) communication system, an LTE and 5G hybrid architecture, a 5G new radio (NR) system, a 6G system, or a new communication system emerging in future communication development. The communication system in this application may alternatively be a machine to machine (M2M) network or another network.

Figure 5:
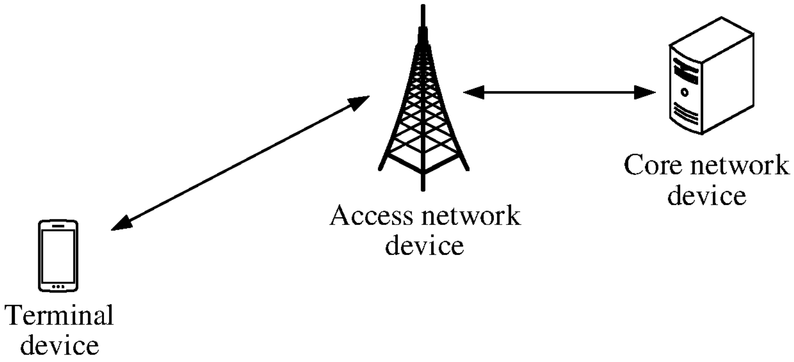
FIG. 5 is a schematic diagram of an architecture of a communication system according to an embodiment of this application.

FIG. 5 shows a communication system according to an embodiment of this application. The communication system may include a terminal device and an access network device, and may further include a core network device. In the communication system, the terminal device may receive a multicast service from the access network device.

Figure 6:
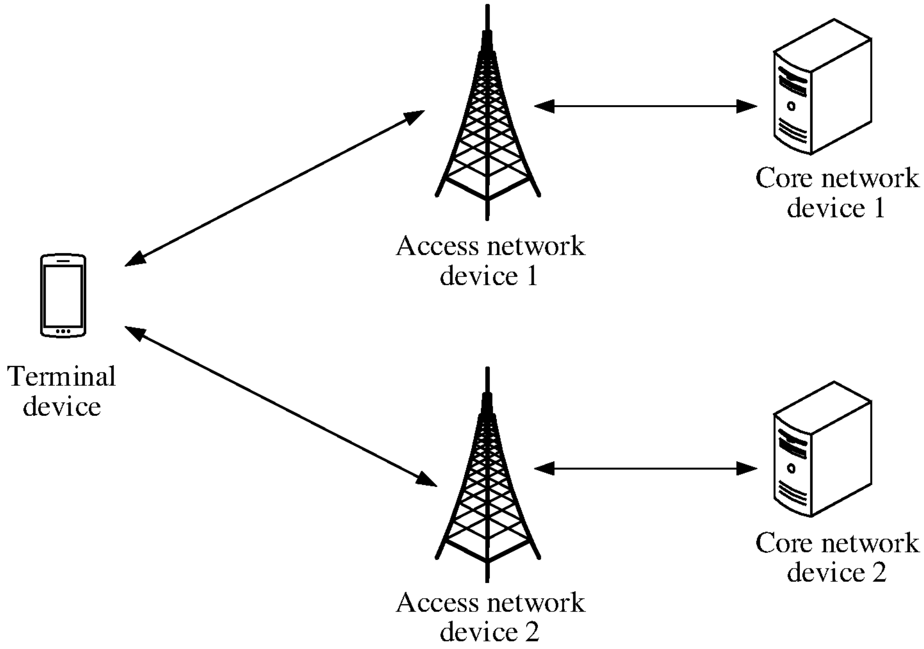
FIG. 6 is a schematic diagram of an architecture of another communication system according to an embodiment of this application.

FIG. 6 shows a communication system according to an embodiment of this application. The communication system may include a terminal device and two access network devices: an access network device 1 and an access network device 2. In the communication system, the terminal device may receive a unicast service from the access network device 1, and receive a multicast service from the access network device 2. The two services may share a baseband capability of the terminal device.

Optionally, the access network device 1 and the access network device 2 may be connected to different core network devices. For example, the communication system may further include a core network device 1 and a core network device 2. The access network device 1 is connected to the core network device 1, and the access network device 2 is connected to the core network device 2, as shown in FIG. 6.

Alternatively, the access network device 1 and the access network device 2 may be connected to a same core network device. For example, the communication system includes a core network device 3, and both the access network device 1 and the access network device 2 are connected to the core network device 3.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

The following describes the technical solutions in embodiments of this application with reference to the accompanying drawings in embodiments of this application.

Figure 7:
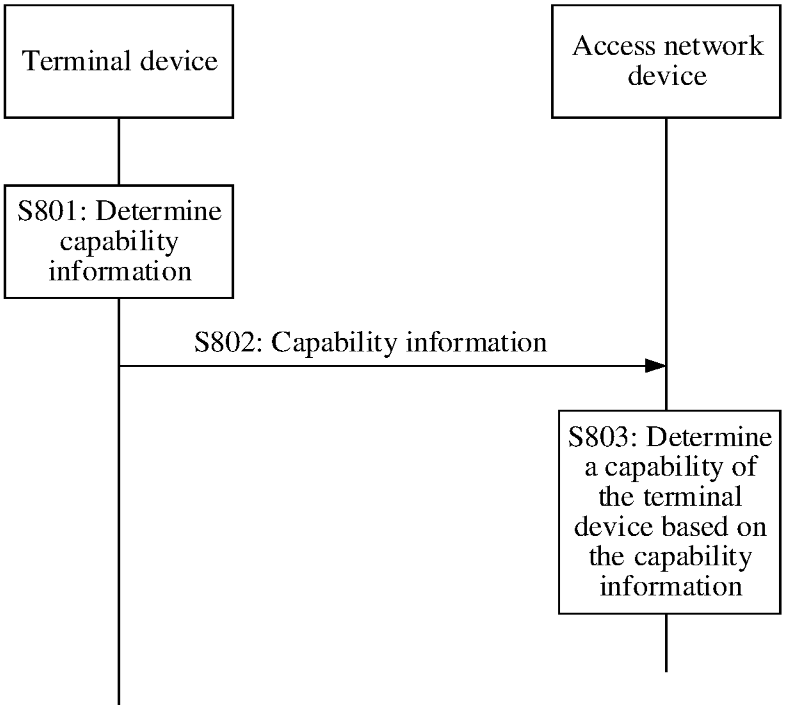
FIG. 7 is a schematic flowchart of a communication method according to an embodiment of this application.

FIG. 7 is a schematic flowchart of a communication method according to an embodiment of this application.

S801: A terminal device determines capability information.

The capability information indicates a multicast service receiving capability corresponding to a band, and/or a multicast service receiving capability corresponding to a CC. For example, a multicast service may include a groupcast service and a broadcast service.

That the capability information indicates a multicast service receiving capability corresponding to a band may be understood as follows: The capability information includes a multicast service receiving capability at a band level (per band). That the capability information indicates a multicast service receiving capability corresponding to a CC may be understood as follows: The capability information includes a multicast service receiving capability at a CC level (per CC).

In embodiments of this application, "a multicast service receiving capability" may also be replaced with "a capability of receiving an MBS service", "an MBS capability", "a groupcast capability", "a broadcast capability", "a ROM capability", "a free to air (FTA) capability", or the like. In embodiments of this application, "a multicast service receiving capability" is used as an example for description.

A specific manner in which the capability information indicates the multicast service receiving capability corresponding to the band and/or the multicast service receiving capability corresponding to the CC is described in detail below.

It should be noted that step S801 may be an optional step, to be specific, the terminal device may not reflect a process of determining the capability information.

S802: The terminal device sends the capability information to an access network device. Correspondingly, the access network device receives the capability information from the terminal device.

Optionally, before step S802 or before S801, the access network device may send capability reporting indication information to the terminal device, where the capability reporting indication information indicates the terminal device to report a multicast service receiving capability.

Specifically, that the capability reporting indication information indicates the terminal device to report a multicast service receiving capability specifically includes: The capability reporting indication information indicates the terminal device to report capabilities corresponding to all bands that support a multicast service; or capabilities corresponding to all bands that support a multicast service and that are included in a current PLMN or a specified PLMN. For example, the capability reporting indication information may indicate, by using one or more values of one or more bits, whether to report the capability. Alternatively, the capability reporting indication information may indicate, depending on whether one or more bits are carried, whether to report the capability. Alternatively, a field in the capability reporting indication information indicates, by using true/false, whether to report the capability.

Alternatively, that the capability reporting indication information indicates the terminal device to report a multicast service receiving capability specifically includes: The capability reporting indication information may carry one or more indexes or identifiers of one or more bands, and the capability reporting indication information indicates the terminal device to report one or more multicast service receiving capabilities on the one or more bands.

S803: The access network device determines a capability of the terminal device based on the capability information.

In an implementation, the access network device may send a multicast service to the terminal device based on the capability information.

Figure 8:
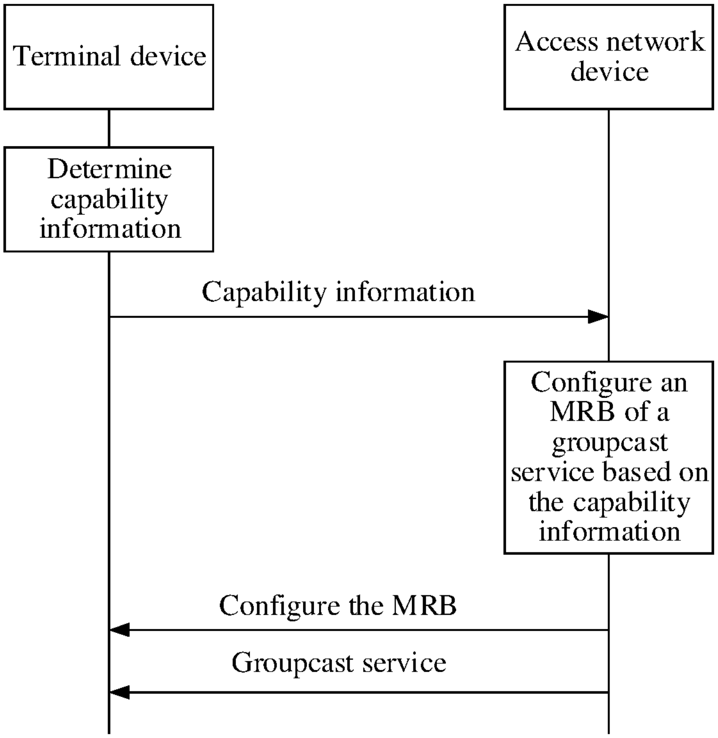
FIG. 8 is a schematic flowchart of sending a groupcast service according to an embodiment of this application.

For example, in the communication system shown in FIG. 5, the terminal device sends capability information to the access network device, and the access network device may send a groupcast service to the terminal device based on the capability information. Specifically, after the terminal device sends the capability information to the access network device, the access network device may configure an MRB of the groupcast service based on the capability information, for example, may configure the MRB by using an RRC configuration message. The access network device sends the groupcast service after configuring the MRB, as shown in FIG. 8.

In another implementation, the access network device may send a unicast service to the terminal device based on the capability information.

For example, in the communication system shown in FIG. 6, the terminal device sends capability information to the access network device 1, and the access network device 1 may send a unicast service to the terminal device based on the capability information.

In a specific implementation, in addition to sending the capability information to the access network device, the terminal device may further send indication information to the access network device. The indication information indicates information about a multicast service that the terminal device is receiving or expects to receive, for example, information such as a session identifier, or a used SCS, BW, or frequency. The access network device may select, based on the capability information and the indication information that are reported by the terminal device, a group of capability information sets supported by the terminal device, so that the access network device can send the unicast service to the terminal device without affecting reception of the multicast service by the terminal device.

Optionally, the terminal device may further send indication information to the access network device. The indication information may indicate a modulation order for a multicast service that is being received or that is expected to be received. For example, an MBS interest indication (MII) indicates the modulation order for the multicast service that is being received or that is expected to be received. Optionally, the indication information may further indicate at least one of the following information of the multicast service that the terminal device is receiving or expects to receive: frequency information (such as a bandwidth and/or a frequency), a TMGI, and an SCS.

A name (or a type) of the indication information is not limited in this application. In the following description, the MII may alternatively be replaced with other information indicating a service that UE is interested in, for example, user assistance information (user assistance information, UAI). For ease of description, the following uses an example in which the indication information is the MII for description.

It should be noted that, a triggering manner, a sending manner, and content of the MII may be implemented independently without depending on the method in FIG. 8. If the triggering manner, the sending manner, and the content of the MII are independently implemented, information indicated by the MII may include the content indicated by the indication information, may not include the content indicated by the indication information, or may include some information in the indication information.

In an implementation, the terminal device may obtain, from MBS traffic channel (MTCH) configuration information, the modulation order for the multicast service that is being received or that is expected to be received. Optionally, in this implementation, before sending the indication information, the terminal device may receive system information from the access network device, where the system information includes MCCH configuration information; and receives an MCCH based on the MCCH configuration information, where the MCCH includes the MTCH configuration information.

In another implementation, the terminal device may alternatively obtain, from downlink control information (DCI), the modulation order for the multicast service that is being received or that is expected to be received. Specifically, the terminal device may report the obtained modulation order in real time, or may report a maximum modulation order after obtaining modulation orders for n times.

Further, after reporting the modulation order for the multicast service that is being received or that is expected to be received, the terminal device may further update the modulation order. For example, after obtaining, from DCI, an updated modulation order for the multicast service that is being received or that is expected to be received, the terminal device sends the updated modulation order to the access network device.

For example, in the communication system shown in FIG. 6, the terminal device sends capability information to the access network device 1, and the terminal device may send an MII to the access network device 1. The MII indicates information about a multicast service that the terminal device is receiving or expects to receive from the access network device 2. The access network device 1 may send a unicast service to the terminal device based on the capability information and the MII that are reported by the terminal device.

In LTE, the terminal device receives mbms-ROM-ServiceIndication in a SIB 2 of a primary cell/primary serving cell (PCell), to trigger the terminal device to report an MII (namely, the indication information). However, in NR or future communication, the information may not exist. Consequently, the terminal device cannot be triggered to report an MII. On this basis, this application provides three methods for triggering the terminal device to report the MII.

In a first method, the access network device sends fourth information to the terminal device to indicate whether to report the MII. The fourth information may indicate to report an inter-PLMN (inter-PLMN) received multicast service, an inter-operator (inter-operator) received multicast service, an inter-base station received multicast service, a non-serving cell (non-serving cell) received multicast service, or an inter-frequency received multicast service.

In the method, after receiving the fourth information, the terminal device may determine whether the MII needs to be reported. The following describes four determining methods. It should be understood that the four methods may be separately implemented, or may be implemented by combining any two, three, or four methods.

Determining method 1: When either of the following cases is satisfied, the terminal device may determine that the MII needs to be reported:

Case 1: A PLMN in a TMGI of the received multicast service is inconsistent with PLMN information included in a SIB 1 of a serving cell of the access network device.

Case 2: A PLMN included in a SIB 1 of a cell in which the multicast service is received is inconsistent with a PLMN included in a SIB 1 of a serving cell of the access network device.

"Inconsistent" in the determining method 1 may be understood as that there is at least a different part between the PLMN in the TMGI (or the SIB 1) of the received multicast service and the PLMN included in the SIB 1 of the serving cell of the access network device.

In this implementation, the fourth information may be one or more bits.

Determining method 2: When either of the following cases is satisfied, the terminal device may determine that the MII needs to be reported:

Case 3: The fourth information includes one or more PLMNs, and a PLMN in a TMGI of the received multicast service is different from the one or more PLMNs.

Case 4: The fourth information includes one or more PLMNs, and a PLMN included in a SIB 1 of a cell in which the multicast service is received is different from the one or more PLMNs.

"Different" in the determining method 2 may be understood as that there is at least a different part between the PLMN in the TMGI (or the SIB 1) of the received multicast service and any one of the one or more PLMNs.

Determining method 3: When one or more of the following cases are satisfied, the terminal device may determine that the MII needs to be reported:

Case 5: A frequency for receiving the multicast service is not a frequency included in a SIB 21 of the serving cell of the access network device.

Case 6: A frequency for receiving the multicast service is different from a frequency in a frequency list included in USD.

Determining method 4: When the following condition is satisfied, the terminal device may determine that the MII needs to be reported:

Case 7: The indication information includes information about one or more frequencies, and a frequency for receiving the multicast service is different from the one or more frequencies.

In the foregoing four determining methods, the access network device may be the access network device 1 in the scenario shown in FIG. 6, and the multicast service may be received from the access network device 2.

In a second method, it may be specified in a protocol that a serving cell of an access network device needs to send a SIB 21 to trigger the terminal device to report the MII. The access network device may be the access network device 1 in the scenario shown in FIG. 6.

In a third method, the terminal device may determine that the MII needs to be reported.

For example, when an inter-PLMN or inter-operator condition is satisfied, the terminal device may determine to report an inter-PLMN (inter-PLMN) received multicast service or an inter-operator received multicast service.

For details, refer to the foregoing determining method 1 or determining method 2. Details are not described herein again.

For another example, when an inter-frequency condition is satisfied, the terminal device may determine to report an inter-frequency received multicast service.

For details, refer to the foregoing determining method 3 or determining method 4. Details are not described herein again.

The foregoing describes the three methods for triggering the terminal device to report the MII. Content of the MII reported by the terminal device is described below with reference to the foregoing three methods.

Based on the first method, the terminal device may determine, based on the fourth information, that the MII needs to be reported, and determine, based on the fourth information, frequency information (for example, a frequency and/or a bandwidth)/a TMGI/an SCS/a modulation order included in the MII.

Based on the third method, the terminal device may determine, based on an inter-operator/an inter-PLMN/an inter-frequency/a non-serving cell, that the MII needs to be reported, and determine, based on operators/PLMNs/frequencies, frequency information (for example, a frequency and/or a bandwidth)/a TMGI/an SCS/a modulation order included in the MII.

Based on the second method, the terminal device may determine, based on the SIB 21, that the MII needs to be reported, and determine, based on an operator/a PLMN/a frequency, frequency information (for example, a frequency and/or a bandwidth)/a TMGI/an SCS/a modulation order included in the MII.

In this embodiment of this application, the terminal device may indicate a multicast capability at a band (or referred to as a frequency band) level and/or a CC level by using the capability information, so that multicast capability reporting accuracy is improved, and the access network device can obtain the refined capability information. In a possible implementation, the access network device may provide a multicast service and/or a unicast service based on the refined capability information, for example, may configure or select a communication parameter for the multicast service and/or the unicast service based on the refined capability information.

The following describes, with reference to a structure of the capability information, a manner in which the capability information indicates the multicast service receiving capability corresponding to the band and/or the multicast service receiving capability corresponding to the cc.

In example description, band combination information in the capability information may indicate the multicast service receiving capability corresponding to the band, and/or the multicast service receiving capability corresponding to the CC; or band information in the capability information may indicate the multicast service receiving capability corresponding to the band. The following separately describes an example in which the band combination information indicates the multicast service receiving capability corresponding to the band, and/or the multicast service receiving capability corresponding to the CC, and an example in which the band information indicates the multicast service receiving capability corresponding to the band.

That the band combination information indicates the multicast service receiving capability corresponding to the band, and/or the multicast service receiving capability corresponding to the CC may be implemented in the following four manners:

Manner 1: It can be learned from the foregoing term introduction (3) that the capability information includes a band combination list, where the band combination list includes a band list and a feature set combination. In this manner, bands that support reception of a multicast service may be listed in the band list in the band combination list, and a feature set combination corresponding to the band list indicates a multicast service receiving capability on the band that supports reception of a multicast service.

Example 1: The capability information includes a first band combination list and an identifier of a first feature set combination. The first band combination list includes first band information, the first band information includes identifiers of N bands that support reception of a multicast service, and N is an integer greater than 0. The first feature set combination includes at least one first parameter set corresponding to the first band combination list, and any first parameter set indicates a multicast service receiving capability corresponding to each of the N bands, and/or a multicast service receiving capability corresponding to a CC on each of the N bands. For example, N may be 1, 2, 3, 4, 5, 6, 7, 8, 9, 10, or the like. In an implementation, a network device may indicate a quantity N of bands that are reported by the terminal device and that support a multicast service, or indicate a maximum quantity of bands that are reported by the terminal device and that support a multicast service.

Optionally, the first band combination list may further include second band information, the second band information includes identifiers of M bands that support a unicast service, and M is an integer greater than 0. Any first parameter set further indicates a unicast service receiving capability corresponding to each of the M bands; or any first parameter set further indicates a communication service receiving capability corresponding to each of the M bands, and a communication service includes a unicast service and a multicast service.

In the example 1, the first band combination list lists the identifiers of the M bands on which the terminal device supports a unicast service and the identifiers of the N bands on which the terminal device supports a multicast service. Herein, bands are distinguished based on communication services supported on the bands. If the terminal device supports reception of a multicast service on one band, the first band information includes an identifier of the band. If the terminal device supports reception of a unicast service on one band, the second band information includes an identifier of the band. If a band supports both reception of a multicast service and reception of a unicast service, an identifier of the band is included in the first band information and the second band information, in other words, the identifier of the band appears twice in the first band combination list.

In an example, in this manner, the structure of the capability information may be that the capability information includes a first band combination list and an identifier of a first feature set combination. The first band combination list includes identifiers of N bands that support reception of a multicast service and identifiers of M bands that support reception of a unicast service. If one band supports reception of a multicast service and a unicast service, an identifier of the band appears twice in the first band combination list. The first feature set combination includes matrix elements of a plurality of feature set indexes (feature set IDs), and each feature set index is associated with one band. Each row of feature set indexes may be considered as one first parameter set, and each row of feature set indexes, namely, the first parameter set, indicates a feature set combination supported by the terminal device in a band combination. Each row of feature set indexes of the first feature set combination, namely, each first parameter set, may include feature set indexes corresponding to the N bands, and may further include feature set indexes corresponding to the M bands.

A feature set index corresponding to each of the N bands corresponds to a group of communication parameters, to indicate a multicast service receiving capability of the terminal device on the band. A feature set index corresponding to each of the M bands corresponds to a group of communication parameters, to indicate a unicast service receiving capability of the terminal device on the band; or indicate a communication service receiving capability of the terminal device on the band. The communication service includes a unicast service and a multicast service, and may further include another service. This is not specifically limited herein.

Optionally, the feature set indexes corresponding to the M bands may include two parts: uplink feature set indexes and downlink feature set indexes. The uplink feature set index may correspond to a group of communication parameters, and the group of communication parameters may include a band-level communication parameter and a CC-level communication parameter. In the group of communication parameters, the band-level communication parameter indicates an uplink sending capability on a band. The CC-level communication parameter indicates an uplink sending capability on a CC.

The downlink feature set index may correspond to a group of communication parameters, and the group of communication parameters may include a band-level communication parameter and a CC-level communication parameter. In the group of communication parameters, the band-level communication parameter indicates a unicast service receiving capability on a band. The CC-level communication parameter indicates a unicast service receiving capability on a band. Alternatively, in the group of communication parameters, the band-level communication parameter indicates a communication service receiving capability on a band. The CC-level communication parameter indicates a communication service receiving capability on a CC.

The feature set indexes corresponding to the N bands may include downlink feature set indexes. The downlink feature set index may correspond to a group of communication parameters, and the group of communication parameters may include a band-level communication parameter and a CC-level communication parameter. In the group of communication parameters, the band-level communication parameter indicates a multicast service receiving capability on a band. The CC-level communication parameter indicates a multicast service receiving capability on a band.

For example, the band-level communication parameter included in the communication parameters corresponding to the uplink feature set indexes of the M bands, the band-level communication parameter included in the communication parameters corresponding to the downlink feature set indexes of the M bands, or the band-level communication parameter included in the communication parameters corresponding to the downlink feature set indexes of the N bands may include at least one of the following types of communication parameters: an SCS, a BW, a quantity of multiple-input multiple-output (MIMO) layers (MIMO layers), a modulation order, and the like.

Optionally, the band-level communication parameter included in the communication parameters corresponding to the downlink feature set indexes of the N bands further includes a flag indicating that reception of a multicast service is supported.

The CC-level communication parameter included in the communication parameters corresponding to the uplink feature set indexes of the M bands, the CC-level communication parameter included in the communication parameters corresponding to the downlink feature set indexes of the M bands, or the CC-level communication parameter included in the communication parameters corresponding to the downlink feature set indexes of the N bands may include at least one of the following types of communication parameters: an SCS corresponding to the CC, a BW corresponding to the CC, a quantity of MIMO layers corresponding to the CC, a modulation order corresponding to the CC, and the like.

Alternatively, the CC-level communication parameter included in the communication parameters corresponding to the downlink feature set indexes of the N bands may be a capability value, and the capability value may be determined based on the foregoing parameter such as the SCS. In an implementation, the capability value may be a weighted sum of the SCS, the BW, the quantity of MIMO layers, and the modulation order. In another implementation, the capability value may be a product of the SCS, the BW, the quantity of MIMO layers, and the modulation order. Certainly, the capability value may alternatively be determined in another calculation manner. This is not specifically limited herein.

Optionally, the CC-level communication parameter included in the communication parameters corresponding to the downlink feature set indexes of the N bands further includes a flag indicating that reception of a multicast service is supported.

The example 1 is described below by using a specific example.

It is assumed that a terminal device supports reception of a unicast service on a band A and a band B, and supports reception of a multicast service on the band B and a band C. A structure of capability information may be shown in Table 1.

TABLE 1

| Capability information (UECapabilityInformation) |
|---|
| Band list 1: A B B (multicast) C (multicast)<br>featureSetCombinationID 1<br>Feature set combination (featureSetCombination1) corresponding to featureSetCombinationID 1: |

TABLE 1-continued

| Capability information (UECapabilityInformation) |
|---|
| [(fsul_n1, fsdl_n1), (fsul_n1, fsdl_n2), (fsdl_n0), (fsdl_n1)] |
| [(fsul_n1, fsdl_n1), (fsul_n1, fsdl_n2), (fsdl_n2), (fsdl_n3)] |
| [(fsul_n1, fsdl_n1), (fsul_n1, fsdl_n2), ... ] |
| [(fsul_ny, fsdl_n2), (fsul_nx, fsdl_n1), (fsdl_n1), (fsdl_n2)] |
| [(fsul_ny, fsdl_n2), (fsul_nx, fsdl_n1), ... ] |
| [(fsul_nx, fsdl_n1), (fsul_n2, fsdl_n4), (fsdl_n2), (fsdl_n0)] |
| [(fsul_nx, fsdl_n1), (fsul_n2, fsdl_n4), ... ] |
| fsdl_n1: |
| Per band parameters |
| Per CC parameters: |
| [CC1:fsdlperCC_n1] |
| [CC2:fsdlperCC_n2] |
| fsdlperCC_n1: |
| Opt1: SCS, BW, MIMO layers, ModulationOrder... |
| Opt2: Capability value |

The example 1 is described with reference to the foregoing Table 1. Table 1 shows band combination information, namely, a band combination list, in the capability information. The band list 1 is a first band combination list. The first band combination list may indicate identifiers of N bands that support reception of a multicast service and identifiers of M bands that support a unicast service. In Table 1, an example in which the band B and the band C support a multicast service, and the band A and the band B support a unicast service is used.

featureSetCombinationID 1 is an identifier of a first feature set combination, the first feature set combination includes at least one first parameter set corresponding to the first band combination list, and each pair of square brackets represents one first parameter set, to indicate a capability supported by the terminal device in a band combination. Each pair of round brackets in a same pair of square brackets sequentially identifies a feature set corresponding to each band in a band combination list. For example, in each pair of square brackets, the first pair of round brackets identifies a feature set corresponding to the band A, the second pair of round brackets identifies a feature set corresponding to the band B, the third pair of round brackets identifies a feature set that corresponds to the band B and that is used for receiving a multicast service, and the fourth pair of round brackets identifies a feature set that corresponds to the band C and that is used for receiving a multicast service.

An element included in each pair of round brackets is a feature set index, where fsul represents a feature set corresponding to an uplink, fsdl represents a feature set corresponding to a downlink, n1, n2, and the like are index values, to be specific, fsul_n1 represents that the feature set corresponding to the uplink is a communication parameter corresponding to an index value n1, and fsdl_n1 represents that the feature set corresponding to the downlink is a communication parameter corresponding to an index value n1. Content indicated by each feature set index corresponds to a same structure. Using fsdl_n1 as an example, as shown in Table 1, fsdl_n1 corresponds to a band-level communication parameter, namely, a per band parameter, and a CC-level communication parameter, namely, a per CC parameter. The per CC parameter specifically includes a feature set identifier corresponding to a CC, for example, a feature set identifier fsdlperCC_n1 corresponding to a CC 1 and a feature set identifier fsdlperCC_n2 corresponding to a CC 2.

The feature set identifier corresponding to the CC may indicate a communication parameter corresponding to the CC, for example, may be an SCS, a BW, a quantity of MIMO layers, or a modulation order corresponding to the CC; and for another example, may be a capability value corresponding to the CC.

It should be understood that a structure of content indicated by another feature set index included in the first feature set combination is similar to a structure of fsdl_n1. For details, refer to related description of fsdl_n1. Details are not described herein again.

In the example 1, one or more bits in capability query may be used to trigger the terminal device to report the capability combination of the band B and the band C for receiving a multicast service; or one or more bits in capability query may be used to trigger the terminal device to report a multicast service receiving capability on the band B (the band B may be a band in a same PLMN or a band in another PLMN); or a band filtering list of an MBS in capability query may include the band B and the band C, to trigger the terminal device to report the capability combination of the band B and the band C for receiving a multicast service.

Example 2: The capability information includes a second band combination list and an identifier of a second feature set combination, where the second band combination list includes identifiers of N bands that support reception of a multicast service, and N is an integer greater than 0; and the second feature set combination includes Q1 groups of parameters corresponding to the second band combination list, where each group of parameters includes Q2 second parameter sets, and any second parameter set indicates a multicast service receiving capability corresponding to each of the N bands, and/or a multicast service receiving capability corresponding to a CC on each of the N bands, where Q1 is an integer greater than 0, and Q2 is an integer greater than 0.

Optionally, the capability information further includes a third band combination list, where the third band combination list includes identifiers of M bands that support reception of a unicast service, and M is an integer greater than 0; and the second feature set combination further includes Q2 third parameter sets corresponding to the third band combination list, and any third parameter set indicates a unicast service receiving capability corresponding to each of the M bands, where second parameter set i in the Q2 second parameter sets corresponds to first parameter set i in any group of the Q1 groups of parameters, and i is an integer greater than 0 and not greater than Q2. It may be understood that, a combination of second parameter set i in the Q2 second parameter sets and first parameter set i in any one of the Q1 parameter groups may indicate a feature set combination supported by the terminal device in a band combination, and the band combination is a band combination obtained by combining the second band combination list and the third band combination list.

In the example 2, the second band combination list lists the identifiers of the N bands on which the terminal device supports reception of a multicast service, and the third band combination list lists the identifiers of the M bands on which the terminal device supports reception of a unicast service. Herein, the bands are distinguished based on communication services supported on the bands. If the terminal device supports reception of a multicast service on one band, the second band combination list includes an identifier of the band. If the terminal device supports reception of a unicast service on one band, the third band combination list includes an identifier of the band. If a band supports both reception of a multicast service and reception of a unicast service, an identifier of the band is included in the second band combination list and the third band combination list.

In an example, in this manner, the structure of the capability information may be that the capability information includes the second band combination list, the third band combination list, and the identifier of the second feature set combination. The second band combination list includes the identifiers of the N bands that support reception of a multicast service, and the third band combination list includes the identifiers of the M bands that support reception of a unicast service. If a band supports reception of a multicast service and a unicast service, an identifier of the band is included in the second band combination list and the third band combination list.

The second feature set combination includes a first matrix and at least one expansion matrix. The first matrix includes matrix elements of a plurality of feature set indexes (feature set IDs), and each feature set index is associated with one of the M bands. Each row of feature set indexes may be considered as a third parameter set. Each row of feature set indexes of the first matrix, namely, each third parameter set, includes the feature set indexes corresponding to the M bands. A feature set index corresponding to each of the M bands corresponds to a group of communication parameters, to indicate a unicast service receiving capability of the terminal device on the band; or indicate a communication service receiving capability of the terminal device on the band. The communication service includes a unicast service and a multicast service.

Each expansion matrix includes matrix elements of a plurality of feature set indexes (feature set IDs), and each feature set index is associated with one of the N bands. Each row of feature set indexes of each expansion matrix may be considered as a second parameter set. Each row of feature set indexes of each expansion matrix, namely, each second parameter set, includes the feature set indexes corresponding to the N bands. A feature set index corresponding to each of the N bands corresponds to a group of communication parameters, to indicate a multicast service receiving capability of the terminal device on the band.

Row i of feature set indexes of the first matrix and row i of feature set indexes of the extension matrix may be combined. A feature set combination obtained through the combination may represent a feature set combination supported by the terminal device in a band combination. The band combination is a band combination obtained by combining the second band combination list and the third band combination list.

For description of meanings of the feature set indexes corresponding to the M bands and meanings of the feature set indexes corresponding to the N bands, refer to the description of the feature set indexes corresponding to the M bands and the feature set indexes corresponding to the N bands in the example 1. Details are not described herein again.

The example 2 is described below by using a specific example.

It is assumed that a terminal device supports reception of a unicast service on a band A and a band B, and supports reception of a multicast service on the band B and a band C. A structure of capability information may be shown in Table 2.

TABLE 2

| Capability information (UECapabilityInformation) | | |
|---|---|---|
| Band list 1: A B | | |
| Band list extend: B (multicast) C (multicast) | | |
| featureSetCombinationID 1 | | |
| Feature set combination corresponding to featureSetCombinationID 1: | | |
| First matrix | | |
| [(fsul_n1, fsdl_n1), (fsul_n1, fsdl_n2)] | | |
| [(fsul_ny, fsdl_n2), (fsul_nx, fsdl_n1)] | | |
| [(fsul_nx, fsdl_n1), (fsul_n2, fsdl_n4)] | | |
| Extension matrix 1: | Extension matrix 2: | Extension matrix 2: |
| [(fsdl_n0), (fsdl_n1)] | [(fsdl_n2), (fsdl_n3)] | [..., ...] |
| [(fsdl_n1), (fsdl_n2)] | [..., ...] | [..., ...] |
| [(fsdl_n2), (fsdl_n0)] | [..., ...] | [(fsdl_n0), (fsdl_n0)] |
| fsdl_n1: | | |
| Per band parameters | | |
| Per CC parameters | | |
| [CC1:fsdlperCC_n1] | | |
| [CC1:fsdlperCC_n2] | | |
| fsdlperCC_n1: | | |
| Opt1: SCS, BW, MIMO layers, ModulationOrder... | | |
| Opt2: Capability value | | |

The example 2 is described with reference to the foregoing Table 2. Table 2 shows band combination information, namely, a band combination list, in the capability information. The band list extend is a second band combination list, and the second band combination list may indicate identifiers of N bands that support reception of a multicast service. In Table 2, an example in which the band B and the band C support a multicast service is used. The band list 1 is a third band combination list, and the second band combination list may indicate identifiers of M bands that support reception of a unicast service. In Table 2, an example in which the band A and the band B support a unicast service is used.

featureSetCombinationID 1 is an identifier of a second feature set combination, and the second feature set combination includes Q2 third parameter sets corresponding to the band list 1. In Table 2, Q2=3 is used as an example. The second feature set combination includes a first matrix, and the first matrix includes Q2=3 third parameter sets corresponding to the band list 1. Each pair of square brackets in the first matrix represents one third parameter set, and each pair of round brackets in a same pair of square brackets sequentially identifies a feature sets corresponding to each band in the band list 1. For example, in each pair of square brackets, the first pair of round brackets identifies a feature set corresponding to the band A, and the second pair of round brackets identifies a feature set corresponding to the band B.

The second feature set combination further includes Q1 groups of parameters corresponding to the band list extend, and each group of parameters includes Q2 second parameter sets. In Table 2, Q1=3 is used as an example. The second feature set combination includes Q1=3 extension matrices, and each extension matrix is a group of parameters corresponding to the band list extend, and includes Q2=3 second parameter sets. Each pair of square brackets in each extension matrix represents one second parameter set, and each pair of round brackets in a same square pair of square brackets sequentially identifies a feature set, for receiving a multicast service, corresponding to each band in the band list extend. For example, in each pair of square brackets, the first pair of round brackets identifies a feature set, for receiving a multicast service, corresponding to the band B, and the second pair of round brackets identifies a feature set, for receiving a multicast service, corresponding to the band C.

A pair of square brackets in the first matrix corresponds one-to-one to a pair of square brackets in each expansion matrix based on rows in which the square brackets are located. The expansion matrix 1 is used as an example, the first row, namely, the first pair of square brackets, in the first matrix corresponds to the first row, namely, the first pair of square brackets, in the expansion matrix. The square brackets with the correspondence may be combined, to indicate a feature set combination supported by the terminal device in a band combination. The band combination is a band combination obtained by combining the band list extend and the band list 1.

In Table 2, for details about the round brackets included in the square brackets, elements included in the round brackets, and meanings indicated by the elements, refer to related description in Table 1. Details are not described herein again.

In Table 2, a quantity of rows of the first matrix is consistent with a quantity of rows of the expansion matrix. In other words, a quantity of third parameter sets included in the first matrix is the same as a quantity of second parameter sets included in the extension matrix.

In the example 2, signaling overheads for capability reporting can be reduced by combining the first matrix and the extension matrix. In addition, for a unicast capability part, an existing mechanism can be reused to the greatest extent, and a protocol is slightly modified.

In the example 2, one or more bits in capability query may be used to trigger the terminal device to report the capability combination of the band B and the band C for receiving a multicast service; or one or more bits in capability query may be used to trigger the terminal device to report a multicast service receiving capability on the band B (the band B may be a band in a same PLMN or a band in another PLMN); or a band filtering list of an MBS in capability query may include the band B and the band C, to trigger the terminal device to report the capability combination of the band B and the band C for receiving a multicast service.

Example 3: The capability information includes a second band combination list and identifiers of Q1 third feature set combinations, where the second band combination list includes identifiers of N bands that support reception of a multicast service, and N is an integer greater than 0. Any third feature set combination includes Q2 fourth parameter sets, and any fourth parameter set indicates a multicast service receiving capability corresponding to each of the N bands, and/or a multicast service receiving capability corresponding to a CC on each of the N bands, where Q1 is an integer greater than 0, and Q2 is an integer greater than 0.

In an optional manner, the capability information may list the identifiers of the Q1 third feature set combinations; or the capability information may include extension information, where the extension information may correspond to the identifiers of the Q1 third feature set combinations.

Optionally, the capability information further includes a third band combination list and an identifier of a fourth feature set combination, where the third band combination includes identifiers of M bands that support reception of a unicast service, and M is an integer greater than 0; and the fourth feature set combination includes Q2 fifth parameter sets, and any fifth parameter set indicates a unicast service receiving capability corresponding to each of the M bands. Fifth parameter set i in the fourth feature set combination corresponds to each fourth parameter combination in third feature set combination i, where i is an integer greater than 0 and not greater than Q2. It may be understood that a combination of fifth parameter set i in the fourth feature set combination and any fourth parameter set combination in third feature set combination i may indicate a feature set combination supported by the terminal device in a band combination. The band combination is a band combination obtained by combining the second band combination list and the third band combination list.

In the example 3, the second band combination list lists the identifiers of the N bands on which the terminal device supports reception of a multicast service, and the third band combination list lists the identifiers of the M bands on which the terminal device supports reception of a unicast service. Herein, the bands are distinguished based on communication services supported on the bands. If the terminal device supports reception of a multicast service on one band, the second band combination list includes an identifier of the band. If the terminal device supports reception of a unicast service on one band, the third band combination list includes an identifier of the band. If a band supports both reception of a multicast service and reception of a unicast service, an identifier of the band is included in the second band combination list and the third band combination list.

In an example, in this manner, the structure of the capability information may be that the capability information includes the second band combination list, the third band combination list, the identifiers of the Q1 third feature set combinations, and the identifier of the fourth feature set combination. The second band combination list includes the identifiers of the N bands that support reception of a multicast service, and the third band combination list includes the identifiers of the M bands that support reception of a unicast service. If a band supports reception of a multicast service and a unicast service, an identifier of the band is included in the second band combination list and the third band combination list.

Each third feature set combination includes matrix elements of a plurality of feature set indexes, and each feature set index is associated with one of the N bands. Each row of feature set indexes of each third feature set combination may be considered as a fifth parameter set. Each row of feature set indexes, namely, each fifth parameter set, of each third feature set combination includes the feature set indexes corresponding to the N bands. A feature set index corresponding to each of the N bands corresponds to a group of communication parameters, to indicate a multicast service receiving capability of the terminal device on the band.

The fourth feature set combination includes matrix elements of a plurality of feature set indexes, and each feature set index is associated with one of the M bands. Each row of feature set indexes may be considered as a fourth parameter set. Each row of feature set indexes, namely, each fourth parameter set, of the fourth feature set combination includes the feature set indexes corresponding to the M bands. A feature set index corresponding to each of the M bands corresponds to a group of communication parameters, to indicate a unicast service receiving capability of the terminal device on the band; or indicate a communication service receiving capability of the terminal device on the band. The communication service includes a unicast service and a multicast service.

A combination of row i of feature set indexes in the fourth feature set combination and any row of feature set indexes in third feature set combination i may indicate a feature set combination supported by the terminal device in a band combination. The band combination is a band combination obtained by combining the second band combination list and the third band combination list.

For description of meanings of the feature set indexes corresponding to the M bands and meanings of the feature set indexes corresponding to the N bands, refer to the description of the feature set indexes corresponding to the M bands and the feature set indexes corresponding to the N bands in the example 1. Details are not described herein again.

The example 3 is described below by using a specific example.

It is assumed that a terminal device supports reception of a unicast service on a band A and a band B, and supports reception of a multicast service on the band B and a band C. A structure of capability information may be shown in Table 3a.

TABLE 3a

| Capability information (UECapabilityInformation) |
|---|
| Band list 1: A B<br>Band list extend: B (multicast) C (multicast)<br>featureSetCombinationID 1<br>featureSetCombination_extend ID list {1 2 3}<br>Feature set combination corresponding to featureSetCombinationID 1:<br>[(fsul_n1, fsdl_n1), (fsul_n1, fsdl_n2)]<br>[(fsul_ny, fsdl_n2), (fsul_nx, fsdl_n1)]<br>[(fsul_nx, fsdl_n1), (fsul_n2, fsdl_n4)]<br>Feature set combination corresponding to featureSetCombination_extend ID 1:<br>[(fsdl_n0), (fsdl_n1)]<br>[(fsdl_n1), (fsdl_n2)]<br>[(fsdl_n2), (fsdl_n0)]<br>Note: A quantity of rows included in the feature set combination corresponding to featureSetCombination_extend ID 1 is consistent with a quantity of rows included in the feature set combination corresponding to featureSetCombinationID 1.<br>Feature set combination corresponding to featureSetCombination_extend ID 2:<br>[(fsdl_n1), (fsdl_n2)]<br>[...,...]<br>[...,...]<br>Note: A quantity of rows included in the feature set combination corresponding to featureSetCombination_extend ID 2 is consistent with a quantity of rows included in the feature set combination corresponding to featureSetCombinationID 1.<br>Feature set combination corresponding to featureSetCombination_extend ID 3:<br>[(fsdl_n2), (fsdl_n0)]<br>[...,...]<br>[...,...]<br>Note: A quantity of rows included in the feature set combination corresponding to featureSetCombination_extend ID 3 is consistent with a quantity of rows included in the feature set combination corresponding to featureSetCombinationID 1.<br>fsdl_n1:<br>Per band parameters<br>Per CC parameters<br>[CC1:fsdlperCC_n1]<br>[CC1:fsdlperCC_n2]<br>fsdlperCC_n1:<br>Opt1: SCS, BW, MIMO layers, ModulationOrder...<br>Opt2: Capability value |

The quantity of rows included in the feature set combination corresponding to featureSetCombinationID 1 may be understood as a quantity of parameter sets included in the feature set combination corresponding to featureSetCombinationID 1.

The quantity of rows included in the feature set combination corresponding to featureSetCombination_extend ID 1 may be understood as a quantity of parameter sets included in the feature set combination corresponding to featureSetCombination_extend ID 1.

The quantity of rows included in the feature set combination corresponding to featureSetCombination_extend ID 2 may be understood as a quantity of parameter sets included in the feature set combination corresponding to featureSetCombination_extend ID 1.

The quantity of rows included in the feature set combination corresponding to featureSetCombination_extend ID 3 may be understood as a quantity of parameter sets included in the feature set combination corresponding to featureSetCombination_extend ID 1.

The example 3 is described with reference to the foregoing Table 3a. Table 3a shows band combination information, namely, a band combination list, in the capability information. The band list extend is a second band combination list, and the second band combination list may indicate identifiers of N bands that support reception of a multicast service. In Table 3a, an example in which the band B and the band C support a multicast service is used. The band list 1 is a third band combination list, and the second band combination list may indicate identifiers of M bands that support reception of a unicast service. In Table 3a, an example in which the band A and the band B support a unicast service is used.

featureSetCombinationID 1 is an identifier of a fourth feature set combination, and the fourth feature set combination includes Q2 third parameter sets corresponding to the band list 1. In Table 3a, Q2=3 is used as an example. The fourth feature set combination includes Q2=3 third parameter sets corresponding to the band list 1, where each pair of square brackets represents one third parameter set, and each pair of round brackets in a same pair of square brackets sequentially identifies a feature set corresponding to each band in the band list 1. For example, in each pair of square brackets, the first pair of round brackets identifies a feature set corresponding to the band A, and the second pair of round brackets identifies a feature set corresponding to the band B.

The featureSetCombination_extend ID list includes identifiers of Q1=3 third feature set combinations. Each third feature set combination includes Q2 second parameter sets. In Table 3a, Q1=3 is used as an example, and each third feature set combination includes Q2=3 fourth parameter sets. Each pair of square brackets in each third feature set combination represents one fourth parameter set, and each pair of round brackets in a same pair of square brackets sequentially identifies a feature set, for receiving a multicast service, corresponding to each band in the band list extend. For example, in each pair of square brackets, the first pair of round brackets identifies a feature set, for receiving a multicast service, corresponding to the band B, and the second pair of round brackets identifies a feature set, for receiving a multicast service, corresponding to the band C.

The first pair of square brackets in the fourth feature set combination may be combined with the 1st third feature set combination, namely, each pair of square brackets included in a third feature set combination corresponding to the index 1 in the featureSetCombination_extend ID list. The second pair of square brackets in the fourth feature set combination may be combined with the 2nd third feature set combination, namely, each pair of square brackets included in a third feature set combination corresponding to the index 2 in the featureSetCombination_extend ID list. The third pair of square brackets in the fourth feature set combination may be combined with the 3rd third feature set combination, namely, each pair of square brackets included in a third feature set combination corresponding to the index 3 in the featureSetCombination_extend ID list.

The third feature set combination corresponding to the index 1 in the featureSetCombination_extend ID list is used as an example. The first pair of square brackets in the fourth feature set combination and the first pair of square brackets in the third feature set combination corresponding to the index 1 in the featureSetCombination_extend ID list are combined, to indicate a feature set combination supported by the terminal device in a band combination. The band combination is a band combination obtained by combining the band list extend and the band list 1. The first pair of square brackets in the fourth feature set combination and the second pair of square brackets in the third feature set combination corresponding to the index 1 in the featureSetCombination_extend ID list are combined, to indicate a feature set combination supported by the terminal device in a band combination. The band combination is a band combination obtained by combining the band list extend and the band list 1. The rest can be deduced by analogy.

In Table 3a, for details about the round brackets included in the square brackets, elements included in the round brackets, and meanings indicated by the elements, refer to related description in Table 1. Details are not described herein again.

In another example, in this manner, the structure of the capability information may be that the capability information includes the second band combination list, the third band combination list, and the identifier of the fourth feature set combination. The second band combination list includes the identifiers of the N bands that support reception of a multicast service, and the third band combination list includes the identifiers of the M bands that support reception of a unicast service. If a band supports reception of a multicast service and a unicast service, an identifier of the band is included in the second band combination list and the third band combination list.

The fourth feature set combination includes matrix elements of a plurality of feature set indexes, and each feature set index is associated with one of the M bands. Each row of feature set indexes may be considered as a fourth parameter set. Each row of feature set indexes, namely, each fourth parameter set, of the fourth feature set combination includes the feature set indexes corresponding to the M bands. A feature set index corresponding to each of the M bands corresponds to a group of communication parameters, to indicate a unicast service receiving capability of the terminal device on the band; or indicate a communication service receiving capability of the terminal device on the band. The communication service includes a unicast service and a multicast service.

The fourth feature set combination may further indicate a third feature set combination corresponding to (or invoked for) each row of feature set indexes.

Each third feature set combination includes matrix elements of a plurality of feature set indexes, and each feature set index is associated with one of the N bands. Each row of feature set indexes of each third feature set combination may be considered as a fifth parameter set. Each row of feature set indexes, namely, each fifth parameter set, of each third feature set combination includes the feature set indexes corresponding to the N bands. A feature set index corresponding to each of the N bands corresponds to a group of communication parameters, to indicate a multicast service receiving capability of the terminal device on the band.

A combination of one row of feature set indexes and any row of feature set indexes in the corresponding third feature set combination may indicate a feature set combination supported by the terminal device in a band combination. The band combination is a band combination obtained by combining the second band combination list and the third band combination list.

For description of meanings of the feature set indexes corresponding to the M bands and meanings of the feature set indexes corresponding to the N bands, refer to the description of the feature set indexes corresponding to the M bands and the feature set indexes corresponding to the N bands in the example 1. Details are not described herein again.

The example 3 is described below by using a specific example.

It is assumed that a terminal device supports reception of a unicast service on a band A and a band B, and supports reception of a multicast service on the band B and a band C. A structure of capability information may be shown in Table 3b.

TABLE 3b

| Capability information (UECapabilityInformation) |
|---|
| Band list 1: A B<br>Band list extend: B (multicast) C (multicast)<br>featureSetCombinationID 1<br>Feature set combination corresponding to featureSetCombinationID 1:<br>[(fsul_n1, fsdl_n1), (fsul_n1, fsdl_n2), featureSetCombination_extend ID 1]<br>[(fsul_ny, fsdl_n2), (fsul_nx, fsdl_n1), featureSetCombination_extend ID 2]<br>[(fsul_nx, fsdl_n1), (fsul_n2, fsdl_n4), featureSetCombination_extend ID 3]<br>Feature set combination corresponding to featureSetCombination_extend ID 1:<br>[(fsdl_n0), (fsdl_n1)]<br>[(fsdl_n1), (fsdl_n2)]<br>[(fsdl_n2), (fsdl_n0)]<br>Note: A quantity of rows included in a feature set combination corresponding to featureSetCombination_extend ID 1 may be the same as or different from a quantity of rows included in a feature set combination corresponding to featureSetCombinationID 1. This is not specifically limited herein.<br>Feature set combination corresponding to featureSetCombination_extend ID 2:<br>[(fsdl_n1), (fsdl_n2)]<br>[...,...]<br>[...,...]<br>Note: A quantity of rows included in a feature set combination corresponding to featureSetCombination_extend ID 2 may be the same as or different from a quantity of rows included in a feature set combination corresponding to featureSetCombinationID 1. This is not specifically limited herein.<br>Feature set combination corresponding to featureSetCombination_extend ID 3:<br>[(fsdl_n2), (fsdl_n0)]<br>[...,...]<br>[...,...]<br>Note: A quantity of rows included in a feature set combination corresponding to featureSetCombination_extend ID 3 may be the same as or different from a quantity of rows included in a feature set combination corresponding to featureSetCombinationID 1. This is not specifically limited herein.<br>fsdl_n1:<br>Per band parameters<br>Per CC parameters<br>[CC1:fsdlperCC_n1]<br>[CC1:fsdlperCC_n2]<br>fsdlperCC_n1:<br>Opt1: SCS, BW, MIMO layers, ModulationOrder...<br>Opt2: Capability value |

The quantity of rows included in the feature set combination corresponding to featureSetCombinationID 1 may be understood as a quantity of parameter sets included in the feature set combination corresponding to featureSetCombinationID 1.

The quantity of rows included in the feature set combination corresponding to featureSetCombination_extend ID 1 may be understood as a quantity of parameter sets included in the feature set combination corresponding to featureSetCombination_extend ID 1.

The quantity of rows included in the feature set combination corresponding to featureSetCombination_extend ID 2 may be understood as a quantity of parameter sets included in the feature set combination corresponding to featureSetCombination_extend ID 2.

The quantity of rows included in the feature set combination corresponding to featureSetCombination_extend ID 3 may be understood as a quantity of parameter sets included in the feature set combination corresponding to featureSetCombination_extend ID 3.

The example 3 is described with reference to the foregoing Table 3b. Table 3b shows band combination information, namely, a band combination list, in the capability information. The band list extend is a second band combination list, and the second band combination list may indicate identifiers of N bands that support reception of a multicast service. In Table 3b, an example in which the band B and the band C support a multicast service is used. The band list 1 is a third band combination list, and the second band combination list may indicate identifiers of M bands that support reception of a unicast service. In Table 3b, an example in which the band A and the band B support a unicast service is used.

featureSetCombinationID 1 is an identifier of a fourth feature set combination, and the fourth feature set combination includes Q2 third parameter sets corresponding to the band list 1. In Table 3b, Q2=3 is used as an example. The fourth feature set combination includes Q2=3 third parameter sets corresponding to the band list 1, where each pair of square brackets represents one third parameter set, and each pair of round brackets in a same pair of square brackets sequentially identifies a feature set corresponding to each band in the band list 1. For example, in each pair of square brackets, the first pair of round brackets identifies a unicast service receiving capability corresponding to the band A, and the second pair of round brackets identifies a unicast service receiving capability corresponding to the band B. For another example, the first pair of round brackets in each pair of square brackets identifies a communication service receiving capability corresponding to the band A. Because the terminal device supports reception of a unicast service on the band A, the communication service receiving capability corresponding to the band A may include a unicast service receiving capability. The second pair of round brackets identifies a communication service receiving capability corresponding to the band B. Because the terminal device supports reception of a unicast service and a multicast service on the band B, the communication service receiving capability corresponding to the band B may include a unicast service receiving capability and a multicast service receiving capability.

Each pair of square brackets further includes a third feature set combination corresponding to the pair of square brackets. For example, the first pair of square brackets includes featureSetCombination_extend ID 1, indicating that the pair of square brackets corresponds to a third feature set combination corresponding to featureSetCombination_extend ID 1. Each third feature set combination includes Q2=3 fourth parameter sets. Each pair of square brackets in each third feature set combination represents one fourth parameter set, and each pair of round brackets in a same pair of square brackets sequentially identifies a feature set corresponding to each band in the band list extend. For example, in each pair of square brackets, the first pair of round brackets identifies the multicast service receiving capability corresponding to the band B, and the second pair of round brackets identifies a multicast service receiving capability corresponding to the band C.

The first pair of square brackets in the fourth feature set combination may be combined with the $1^{st}$ third feature set combination, namely, each pair of square brackets included in the third feature set combination corresponding to featureSetCombination_extend ID 1. The second pair of square brackets in the fourth feature set combination may be combined with the $2^{nd}$ third feature set combination, namely, each pair of square brackets included in a third feature set combination corresponding to featureSetCombination_extend ID 2. The third pair of square brackets in the fourth feature set combination may be combined with the $3^{rd}$ third feature set combination, namely, each pair of square brackets included in a third feature set combination corresponding to featureSetCombination_extend ID 3.

The third feature set combination corresponding to featureSetCombination_extend ID 1 is used as an example. The first pair of square brackets in the fourth feature set combination and the first pair of square brackets in the third feature set combination corresponding to featureSetCombination_extend ID 1 are combined, to indicate a feature set combination supported by the terminal device in a band combination. The band combination is a band combination obtained by combining the band list extend and the band list 1. The first pair of square brackets in the fourth feature set combination and the second pair of square brackets in the third feature set combination corresponding to featureSetCombination_extend ID 1 are combined, to indicate a feature set combination supported by the terminal device in a band combination. The band combination is a band combination obtained by combining the band list extend and the band list 1. The rest can be deduced by analogy.

In Table 3b, for details about the round brackets included in the square brackets, elements included in the round brackets, and meanings indicated by the elements, refer to related description in Table 1. Details are not described herein again.

In the example 3, capability reporting signaling overheads can be reduced by combining the identifier of the fourth feature set combination and the identifier of the third feature set combination. In addition, for a unicast capability part, an existing mechanism can be reused to the greatest extent, and a protocol is slightly modified.

Example 4: The capability information includes a fourth band combination list and an identifier of a fifth feature set combination, where the fourth band combination list includes identifiers of X bands supported by the terminal device, and X is an integer greater than 0; and the fifth feature set combination includes at least one sixth parameter set, any sixth parameter set indicates a communication parameter corresponding to each of the X bands, the X bands include N bands that support reception of a multicast service, and a communication parameter corresponding to any one of the N bands indicates a multicast service receiving capability corresponding to the band, and/or a communication capability corresponding to a CC on the band, where if the CC supports reception of a multicast service, the communication capability corresponding to the CC is a multicast service receiving capability corresponding to the CC, and N is an integer greater than 0 and not greater than X.

In the example 4, the fourth band combination list lists the identifiers of the X bands supported by the terminal device. Herein, whether the terminal device supports multicast is not distinguished. Provided that the terminal device supports communication on one band, the fourth band combination list includes an identifier of the band. If a band supports both reception of a multicast service and reception of a unicast service, an identifier of the band appears once in the fourth band combination list.

In an example, in this manner, the structure of the capability information may be that the capability information includes the fourth band combination list and the identifier of the fifth feature set combination. The fourth band combination list includes the identifiers of the X bands supported by the terminal device. If one band supports reception of a multicast service and a unicast service, an identifier of the band appears once in the fourth band combination list. The fifth feature set combination includes matrix elements of a plurality of feature set indexes (feature set IDs), and each feature set index is associated with one band. Each row of feature set indexes may be considered as one sixth parameter set, and each row of feature set indexes, namely, each sixth parameter set, indicates a feature set combination supported by the terminal device in a band combination. Each row of feature set indexes, namely, each sixth parameter set, of the fifth feature set combination may include feature set indexes corresponding to the X bands.

A feature set index corresponding to each of the X bands corresponds to a group of communication parameters, to indicate a communication capability of the terminal device on the band. Optionally, the feature set indexes corresponding to the X bands may include two parts: uplink feature set indexes and downlink feature set indexes. The uplink feature set index may correspond to a group of communication parameters, and the group of communication parameters may include a band-level communication parameter and a CC-level communication parameter. In the group of communication parameters, the band-level communication parameter indicates an uplink sending capability on a band. The CC-level communication parameter indicates an uplink sending capability on a band.

The downlink feature set index may correspond to a group of communication parameters, and the group of communication parameters may include a band-level communication parameter and a CC-level communication parameter. In the group of communication parameters, the band-level communication parameter indicates a communication service receiving capability on a band. The CC-level communication parameter indicates a communication service receiving capability on a CC.

In example description, if the terminal device does not support uplink sending on one band, an uplink feature set index corresponding to the band may be a first feature set index, and the first feature set index indicates that the terminal device does not support uplink sending.

If the terminal device supports reception of a multicast service on one band, a communication parameter corresponding to a downlink feature set index corresponding to the band may indicate a multicast service receiving capability of the terminal device on the band, and may specifically include at least one of the following: a band-level communication parameter for receiving a multicast service and a CC-level communication parameter for receiving a multicast service.

The band-level communication parameter for receiving a multicast service may include at least one of the following types of communication parameters: a flag indicating that reception of a multicast service is supported, an SCS, a BW, a quantity of MIMO layers, a modulation order, and the like.

The CC-level communication parameter for receiving a multicast service may include at least one of the following types of communication parameters: a flag indicating that reception of a multicast service is supported, an SCS, a BW, a quantity of MIMO layers, a modulation order, and the like.

The example 4 is described below by using a specific example.

It is assumed that a terminal device supports reception of a unicast service on a band A and a band B, and supports reception of a multicast service on the band B and a band C. A structure of capability information may be shown in Table 4.

TABLE 4

| Capability information (UECapabilityInformation) |
|---|
| Band list 1: A B C<br>featureSetCombinationID 1<br>Feature set combination corresponding to featureSetCombinationID 1:<br>[(fsul_n1, fsdl_n1), (fsul_n1, fsdl_n2), (fsul_no, fsdl_n0)]<br>[(fsul_ny, fsdl_n2), (fsul_nx, fsdl_n1), (fsul_no, fsdl_n4)]<br>[(fsul_nx, fsdl_n1), (fsul_n2, fsdl_n4), (fsul_no, fsdl_n5)]<br>fsdl_n1:<br>Per band parameters: If the band supports reception of a multicast service, the per band parameters include a communication parameter for receiving a multicast service.<br>Per CC parameters<br>[CC1:fsdlperCC_n1]<br>[CC2:fsdlperCC_n2]<br>fsdlperCC_n1: Optionally, if the CC supports reception of a multicast service, fsdlperCC_n1 includes a communication parameter for receiving a multicast service. |

The example 4 is described with reference to the foregoing Table 4. Table 4 shows band combination information, namely, a band combination list, in the capability information. The band list 1 is a fourth band combination list, and the fourth band combination list may indicate identifiers of X bands supported by the terminal device. It should be noted that whether a band supports a multicast service is not distinguished in the band list 1 herein.

featureSetCombinationID 1 is an identifier of a fifth feature set combination, and the fifth feature set combination includes at least one sixth parameter set corresponding to the band list 1. Each pair of square brackets represents one sixth parameter set, to indicate a capability supported by the terminal device in a band combination. Each pair of round brackets in a same pair of square brackets sequentially identifies a feature set corresponding to each band in a band combination list. For example, in each pair of square brackets, the first pair of round brackets identifies a feature set corresponding to the band A, the second pair of round brackets identifies a feature set corresponding to the band B, and the third pair of round brackets identifies a feature set corresponding to the band C.

An element included in each pair of round brackets is a feature set index, where fsul represents a feature set corresponding to an uplink, fsdl represents a feature set corresponding to a downlink, n1, n2, and the like are index values, to be specific, fsul_n1 represents that the feature set corresponding to the uplink is a communication parameter corresponding to an index value n1, and fsdl_n1 represents that the feature set corresponding to the downlink is a communication parameter corresponding to an index value n1. Content indicated by each feature set index corresponds to a same structure.

Using fsdl_n1 as an example, as shown in Table 1, fsdl_n1 corresponds to a band-level communication parameter, namely, a per band parameter, and a CC-level communication parameter, namely, a per CC parameter. The per CC parameter specifically includes a feature set identifier corresponding to a CC, for example, a feature set identifier fsdlperCC_n1 corresponding to a CC 1 and a feature set identifier fsdlperCC_n2 corresponding to a CC 2. If the band supports reception of a multicast service, the per band parameter may include a communication parameter for receiving a multicast service.

The feature set identifier corresponding to the CC may indicate a communication parameter corresponding to the CC, for example, may be an SCS, a BW, a quantity of MIMO layers, or a modulation order corresponding to the CC. If the CC supports reception of a multicast service, the communication parameter indicated by the feature set identifier corresponding to the CC may include a communication parameter for receiving a multicast service.

In the example 4, a communication parameter corresponding to a feature set index indicates a multicast service receiving capability, so that capability reporting signaling overheads can be reduced. In addition, for a unicast capability part, an existing mechanism can be reused to the greatest extent, and a protocol is slightly modified.

In addition, a communication parameter that is used to receive a multicast service and that corresponds to a CC is included in a CC-level communication parameter, so that a CC-level refined capability design on the band can be implemented, capability reporting accuracy can be improved, and a protocol is slightly modified.

The foregoing describes the four examples of the manner 1. Based on any one of the foregoing examples, in example description, downlink feature set indexes may be divided based on supported communication services. For example, a first index set is used for a band that supports reception of a multicast service, and a second index set is used for a band that does not support reception of a multicast service. In example description, the first index set may include a feature set index within a first index range, for example, a feature set index within a range of 201 to 300. The second index set may include a feature set index within a second index range, for example, a feature set index within a range of 101 to 200.

An index of a communication parameter, which may be specifically a downlink feature set index, of any one of the X bands satisfies: If a band supports reception of a multicast service, an index of a communication parameter, namely, a downlink feature set index, corresponding to the band belongs to the first index set. If a band does not support reception of a multicast service, an index of a communication parameter, namely, a downlink feature set index, corresponding to the band belongs to the second index set. Correspondingly, after receiving the capability information reported by the terminal device, the access network device may determine, based on a set in which a downlink feature set index of a band is located, whether the band supports reception of a multicast service. Specifically, if the downlink feature set index of the band belongs to the first index set, it may be determined that the band supports reception of a multicast service; or if the downlink feature set index of the band belongs to the second index set, it may be determined that the band does not support reception of a multicast service.

In a possible implementation, that a communication parameter corresponding to any one of the X bands indicates a communication capability corresponding to a CC on the band is implemented in the following manner: The communication parameter corresponding to any one of the X bands includes an index of the communication capability corresponding to the CC on the band.

In example description, the index of the communication capability corresponding to the CC may also be divided based on supported communication services. For example, a third index set is used for a CC that supports reception of a multicast service. A fourth index set is used for a CC that does not support reception of a multicast service. In example description, the third index set may include an index within a third range. The fourth index set may include an index within a fourth range.

An index of a communication capability corresponding to any CC on any one of the X bands satisfies: If a CC supports reception of a multicast service, an index of a communication parameter corresponding to the CC belongs to the third index set; or if a CC does not support reception of a multicast service, an index of a communication parameter corresponding to the CC belongs to the fourth index set. Correspondingly, after receiving the capability information reported by the terminal device, the access network device may determine, based on a set in which an index corresponding to a CC is located, whether the CC supports reception of a multicast service. Specifically, if the index of the CC belongs to the third index set, it may be determined that the CC supports reception of a multicast service; or if the index of the CC belongs to the fourth index set, it may be determined that the CC does not support reception of a multicast service.

Manner 2: It can be learned from the foregoing term introduction (3) that the capability information includes band information, namely, a band list. In this manner, a band that supports reception of a multicast service may be listed in the band list, and a communication parameter corresponding to the band indicates a multicast service receiving capability on the band that supports reception of a multicast service. For example, the communication parameter corresponding to the band may include a flag indicating that reception of a multicast service is supported, a modulation order for receiving a multicast service, an SCS for receiving a multicast service, and a BW for receiving a multicast service. For example, the capability information may be shown in Table 5.

TABLE 5

| Capability information (UECapabilityInformation) |
|---|
| Band list: |
| A |
| B > Flag indicating that reception of a multicast service is supported |
| C > Flag indicating that reception of a multicast service is supported |

The manner 2 is described with reference to Table 5. Table 5 shows band information, namely, a band list, in capability information. The band List may include X bands supported by the terminal device and a communication parameter corresponding to each band. If a band supports reception of a multicast service, a communication parameter corresponding to the band includes a flag indicating that reception of a multicast service is supported, a modulation order for receiving a multicast service, an SCS for receiving a multicast service, a BW for receiving a multicast service, and the like.

In the manner 2, a band-level multicast service receiving capability may be indicated, and a protocol is slightly modified.

It should be noted that the foregoing manner 1 and manner 2 may be separately implemented, or may be combined as one solution for implementation. For example, in the manner 2, a band that supports reception of a multicast service may be indicated, or a part of communication parameters for receiving a multicast service on the band may be indicated. Any example in the manner 1 indicates another part of the communication parameters for receiving a multicast service on the band. For example, if the band A supports reception of a multicast service, a communication parameter corresponding to the band A in the band list may include a flag indicating that reception of a multicast service is supported, and may further include a modulation order for receiving a multicast service on the band A. In addition, another communication parameter for receiving a multicast service on the band A is indicated by using featureSetCombination, for example, an SCS and a BW for receiving a multicast service on the band A; or for another example, another CC-level communication parameter for receiving a multicast service on the band A.

For a specific manner of indicating, by using featureSetCombination, the another communication parameter for receiving a multicast service on the band A, refer to the example 1 to the example 4. Details are not described herein again.

The foregoing describes the manner in which the capability information indicates the multicast service receiving capability corresponding to the band and/or the multicast service receiving capability corresponding to the CC.

Optionally, in addition to the multicast service receiving capability corresponding to the band and/or the multicast service receiving capability corresponding to the CC, the capability information may further indicate multicast modulation information corresponding to at least one band, where the multicast modulation information is a highest modulation order supported during reception of a multicast service. In an implementation, multicast modulation information corresponding to a band may be indicated in a communication parameter corresponding to the band in the band List.

In example description, if the highest modulation order supported during reception of a multicast service on the band is a modulation order supported by all terminal devices, or a modulation order mandatory for the terminal device, the highest modulation order supported during reception of a multicast service on the band may not be reported in the capability information.

Figure 9:
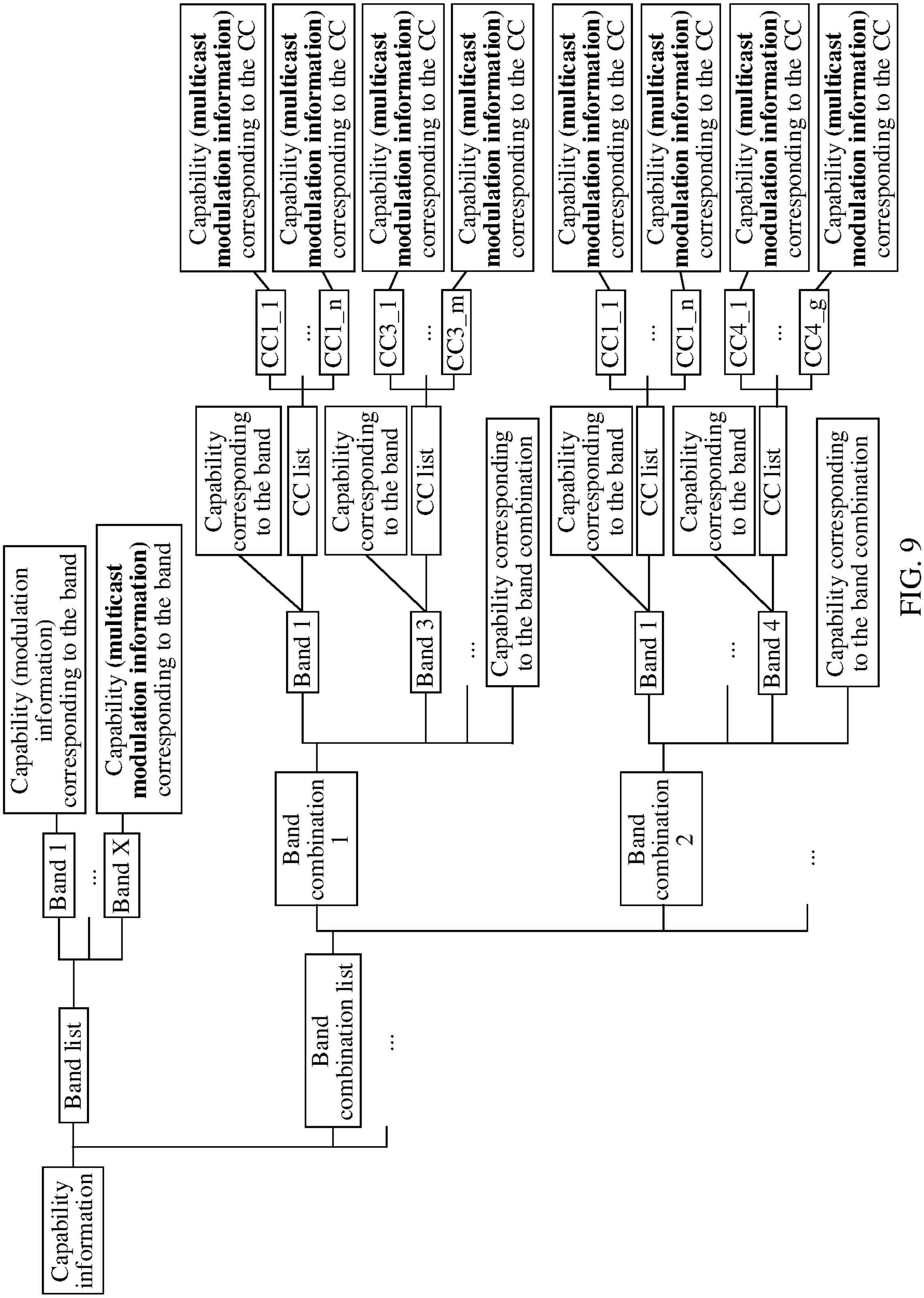
FIG. 9 is a schematic diagram of a structure of capability information according to an embodiment of this application.

It can be learned from the foregoing description that the capability information may include band-level multicast modulation information. For example, a communication parameter corresponding to a band in the band List includes multicast modulation information corresponding to the band. The capability information may further include CC-level multicast modulation information. For example, a CC-level communication parameter indicated by a feature set combination includes CC-level multicast modulation information. As shown in FIG. 9, a "multicast modulation order" shown in FIG. 9 represents a highest modulation order supported during reception of a multicast service.

In example description, the CC-level multicast modulation information does not actually restrict a maximum order used on a CC, and the access network device may determine, based on the CC-level multicast modulation information, a peak rate at which the terminal device receives a multicast service on the CC. Under this peak rate constraint, the terminal device may use a modulation order, for example, a modulation order 1, higher than the modulation order. It should be understood that a prerequisite for using the modulation order 1 is that a corresponding band supports the modulation order 1. For example, a modulation order supported by the terminal device on a CC 1 is 64 quadrature amplitude modulation (quadrature amplitude modulation, QAM). A modulation order supported by a band corresponding to the CC 1 is 256 QAM. In this case, the terminal device may use 256 QAM on the CC 1, provided that a peak block length for scheduling 256 QAM is less than 0r equal to a peak block length for scheduling 64 QAM.

Currently, the capability information is designed based on a structure of a carrier aggregation (carrier aggregation, CA) combination, and existing CA has the following requirements:

When CA is deployed frame timing and SFN are aligned across cells that can be aggregated (synchronous CA), or an offset in multiples of slots between the PCell/PSCell and an SCell is configured to the UE (asynchronous CA).

The terminal device can use a CA technology only when all cells are frame aligned (a maximum difference between the cells is allowed to be not greater than half a frame in asynchronous CA). In a scenario in which the terminal device simultaneously receives a unicast service and a multicast service, the unicast service and the multicast service may be received from different access network devices, and even the two access network devices may not be of one PLMN/operator. Therefore, the access network devices cannot determine whether the access network devices are frame aligned. Therefore, scheduling of the multicast service and/or the unicast service by the access network devices may exceed a capability range of the terminal device.

In a possible implementation solution, capability information (which may be the foregoing capability information after multicast enhancement or a unicast capability in the conventional technology) sent by the terminal device may further indicate whether the terminal device supports simultaneous reception of a unicast service and a multicast service in a case of synchronization (that is, frame alignment) or unsynchronization (that is, frame unaligned) in different capability combinations.

It should be noted that, a related solution in which the terminal device indicates whether to support simultaneous reception of a unicast service and a multicast service in a case of synchronization (that is, frame alignment) or unsynchronization (that is, frame unaligned) in different capability combinations may be independently implemented without depending on the method in FIG. 8.

In the foregoing manner, new indication information is introduced to indicate whether to support simultaneous reception of a unicast service and a multicast service in a case of synchronization (that is, frame alignment) or unsynchronization (that is, frame unaligned) in different capability combinations, so that the access network device can provide a unicast service more properly.

In another possible implementation solution, the terminal device may be reused to indicate whether a capability of asynchronous CA or asynchronous DC is supported. If the terminal device supports asynchronous CA, it may be considered that the terminal device supports simultaneous reception of a unicast service and a multicast service.

In still another possible implementation solution, when reporting a unicast capability, the terminal device may report a capability combination currently available for a multicast service. Optionally, a fallback (fall back) capability may be further reported. The fallback capability is weakened of an existing unicast capability. For example, a band A supports 100 M, and a band B supports 50 M. The fallback capability may be a weakened capability such as that the band A supports 80 M, and the band B supports 50 M. Specific capability information may be shown in the following Table 6.

TABLE 6

| Capability information (UECapabilityInformation) |
|---|
| Band list 1: A B<br>featureSetCombinationID 1<br>Feature set combination corresponding to featureSetCombinationID 1:<br>[(fsul_n1, fsdl_n1), (fsul_n1, fsdl_n2)]<br>[(fsul_n3, fsdl_n3), (fsul_n3, fsdl_n4)] (Fallback combination, which is still reported in the current format)<br>[(fsul_ny, fsdl_n2), (fsul_nx, fsdl_n1)]<br>[(fsul_nx, fsdl_n1), (fsul_n2, fsdl_n2)]<br>fsdl_n1:<br>Per band parameters<br>Per CC parameters<br>[CC1:fsdlperCC_n1]<br>[CC1:fsdlperCC_n2] |

Based on the reported capability combinations, when the terminal device starts to receive a multicast service, the terminal device may select a capability combination that can be used and send the capability combination to a network device. For example, the terminal device currently receives a unicast service on the band A. After the terminal device starts to receive a multicast service (a band for receiving the multicast service is not limited herein), the terminal device may send, to the network device after the multicast service is received, a capability combination that can be further used, for example, the first row and/or the second row and/or the third row. Specifically, the terminal device may report, by using an MII procedure or a user assistance information (user assistance information, UAI) procedure, the capability combination that can be used.

The following describes two methods for reporting, by the terminal device, a capability combination that can be used.

Method A: The capability information reported by the terminal device carries identifiers (or indexes) of capability combinations. For example, in Table 3b, the feature set combination corresponding to featureSetCombinationID 1 includes four rows (namely, four capability combinations), and identifiers are 1, 2, 3, and 4 respectively.

When the terminal device starts to receive a multicast service, the terminal device may select an identifier of a capability combination that supports simultaneous reception of a current unicast service and the multicast service, and report the identifier. Specifically, one identifier may be reported, or all identifiers that satisfy the requirement may be reported.

Alternatively, when receiving a multicast service, the terminal device reports an identifier of a maximum capability combination of a unicast service. Because the capability information reported by the terminal device may not include a capability combination that can simultaneously support the unicast service and the multicast service, in this manner, the maximum capability of the supported unicast service is reported, so that the access network device can adjust, for the terminal device, a resource occupied by the unicast service.

Method B: The terminal device may report a band combination, featureSetCombinationID, and featureSet ID of the capability combination. In other words, the terminal device reports capability information to the access network device again by using an index. Similarly, the capability combination that can be used and that is reported by the terminal device may be a capability combination that supports simultaneous reception of a unicast service and a multicast service; or may be a maximum capability supported by a unicast service when a multicast service is satisfied.

Based on the method A or the method B, after receiving the indication information reported by the terminal device, the access network device may provide a unicast service within the capability combination indicated by the terminal device.

In this embodiment of this application, a band-level multicast service receiving capability or a CC-level multicast service receiving capability is reported in the capability information, so that the multicast capability can be accurately reported. Therefore, the access network device can provide a multicast service based on the refined capability information, or the terminal device can provide a unicast service more accurately.

In addition, communication efficiency of a multicast service and a unicast service can be improved by reporting a supported highest modulation order for receiving a multicast service and a modulation order for a multicast service that is being received or expected to be received.

Currently, an MII (which may be the enhanced MII described above, may be an existing MII, or may be an MII that appears in future communication development) may be exchanged between access network devices. The access network devices exchange an MII by using an inter-node RRC message (Inter-node RRC message), to send a service that a terminal device is interested in to a neighboring access network device. The MII may include a TMGI that the terminal device is interested in or is receiving. The TMGI includes PLMN information. A specific form of the TMGI is as follows:

```
TMGI-r17 ::=              SEQUENCE {
  plmn-Id-r17               CHOICE {
    plmn-Index                  INTEGER (1..maxPLMN),
    explicitValue             PLMN-Identity
  },
  serviceId-r17             OCTET STRING (SIZE (3))
}
```

It can be learned that the PLMN information may be in two forms: One is a PLMN index value (plmn-Index), and the other is a specific PLMN value (explicitValue). For the PLMN index value, an index value reported by the terminal device is a PLMN index value in a PLMN identity information list (plmn-IdentityInfoList) or a non-public network (non-public network, NPN) identity information list (npn-IdentityInfoList) in a SIB 1, or a stand-alone non-public network (stand-alone non-public network, SNPN) index value.

plmn-IdentityInfoList includes a plurality of pieces of PLMN-IdentityInfo, including a plurality of PLMN indexes and cell IDs. Specifically, a PLMN index value of PLMN i of cell n may be calculated by using a formula b1+b2+ . . . +b(n−1)+i, where b(n−1) is a quantity of PLMNs included in cell (n−1). A PLMN index value corresponding to each PLMN may be obtained in this manner.

The PLMN information in the TMGI received by the terminal device may be a PLMN index value, or may be a PLMN value.

If the TMGI in the MII reported by the terminal device is reported by using a PLMN index value, when access network devices exchange an MII message, the terminal device is usually directly forwarded to another access network device, and the another access network device cannot determine a PLMN corresponding to the PLMN index value. As a result, the PLMN index value in the TMGI cannot be interpreted, and the another access network device cannot correctly identify the TMGI.

For the foregoing problem, a possible solution is as follows: A source access network device may send a correspondence to another access network device. The correspondence is a one-to-one correspondence between one or more PLMN index values and one or more PLMN values. Therefore, after the source access network device receives indication information from the terminal device, the indication information indicates information (for example, the foregoing MII) about a multicast service that the terminal device is receiving or expects to receive. If the indication information includes at least one PLMN index value, the source access network device may send the indication information to another access network device. The another access network device may determine a corresponding PLMN based on the correspondence and the PLMN index value included in the indication information.

It should be noted that the solution may be implemented independently without depending on the method in FIG. 8.

The following describes four implementations of the correspondence.

Implementation 1: The source access network device sends PLMN identity information in a SIB 1 to another access network device, where the PLMN identity information indicates the correspondence. For example, the PLMN identity information may include one or more PLMN values, and a sequence of the one or more PLMN values indicates the correspondence.

For example, the source access network device sends PLMN-IdentityInfo to the another access network device. In comparison with the method in which access network devices exchange a SIB 1 in LTE, in this method, only required information needs to be exchanged, and other unnecessary information in the SIB 1 is not exchanged much, so that signaling overheads are low.

Implementation 2: In a current Xn protocol, cell-related information is forwarded in an Xn interface setup (Xn Setup) procedure and an NG-RAN node configuration update (NG-RAN node Configuration Update) procedure. The cell-related information includes a PLMN list of broadcast information of each cell. The PLMN list includes a PLMN list broadcast in a SIB corresponding to each cell (CGI), namely, plmn-IdentityList in PLMN-IdentityInfo.

Based on this, the source access network device may indicate a correspondence between a PLMN index value and a specific PLMN value in the cell-related information. For example, the PLMN index value corresponding to the specific PLMN value may be carried in the cell-related information.

For example, a first access network device sends an Xn interface setup message or an NG-RAN node configuration update message to a second access network device, where the Xn interface setup message or the NG-RAN node configuration update message includes information about at least one cell, and information about a first cell in the at least one cell indicates at least one PLMN of the first cell and a PLMN index value corresponding to each PLMN.

Alternatively, the source access network device may make a sequence of the PLMNs in the cell-related information consistent with a sequence of the PLMNs of the cell in the SIB 1, which may be specifically specified in a protocol or implemented by the access network device. In addition, an offset of the PLMN index value is forwarded to another access network device. Specifically, the offset may be a total quantity of PLMNs of each cell before the cell. For example, related information of cell n may include a total quantity of PLMNs b1+b2+ . . . +b(n−1) of cell 1 to cell (n−1).

For example, a first access network device sends an Xn interface setup message or an NG-RAN node configuration update message to a second access network device, where the Xn interface setup message or the NG-RAN node configuration update message includes information about at least one cell, information about cell n in the at least one cell indicates at least one PLMN and an offset of cell n, the offset is a total quantity of PLMNs from cell 1 to cell (n−1) in the at least one cell, and n is an integer greater than 0.

It should be noted that a sequence of the correspondence and the indication information is not limited in this application. The correspondence may be sent before the indication information, or the indication information may be sent before the correspondence, or the correspondence and the indication information may be simultaneously sent. For example, the correspondence and the indication information are sent by using a message (or signaling).

For the foregoing problem, another possible solution is as follows: The terminal device receives service information from the access network device, where the service information includes a first TMGI, and the first TMGI includes a first PLMN index value. After determining a PLMN value corresponding to the first PLMN index value, the terminal device sends an MII to the access network device, where the MII includes a second TMGI, and the second TMGI includes the PLMN value corresponding to the first PLMN index value. A service ID in the first TMGI is the same as a service ID in the second TMGI. The access network device may be an access network device that provides a multicast service for the terminal device.

In a possible implementation, the second TMGI is a TMGI carried in an application layer message (for example, a service announcement (service announcement) message) received by the terminal device.

In another possible implementation, the second TMG is generated by the terminal device based on the first TMGI and the PLMN value corresponding to the first PLMN index value. For example, the terminal device may replace the first PLMN index value in the first TMGI with the PLMN value corresponding to the first PLMN index value, and then generate the second TMGI.

Optionally, after receiving the MII reported by the terminal device, the access network device may forward the MII to another access network device.

For the foregoing problem, another possible solution is as follows: A source access network device receives first indication information from a terminal device, where the first indication information indicates information about a multicast service that the terminal device is receiving or expects to receive, and the first indication information includes at least one PLMN index value; and the source access network device sends second indication information to another access network device, where PLMN information in the second indication information is a PLMN value corresponding to the at least one PLMN index value.

Optionally, the second indication information is obtained by replacing the at least one PLMN index value in the first indication information with the PLMN value corresponding to the at least one PLMN index value.

For example, the first indication information indicates at least one of the following information of the multicast service that the terminal device is receiving or expects to receive: frequency information, a TMGI, an SCS, or a modulation order.

For example, after receiving an MII reported by the terminal device, if the MII includes a PLMN index value, the source access network device sends a specific PLMN value corresponding to the PLMN index value to another access network device. For example, the source access network device re-encodes the specific PLMN value and sends the value to the another access network device.

Figure 10:
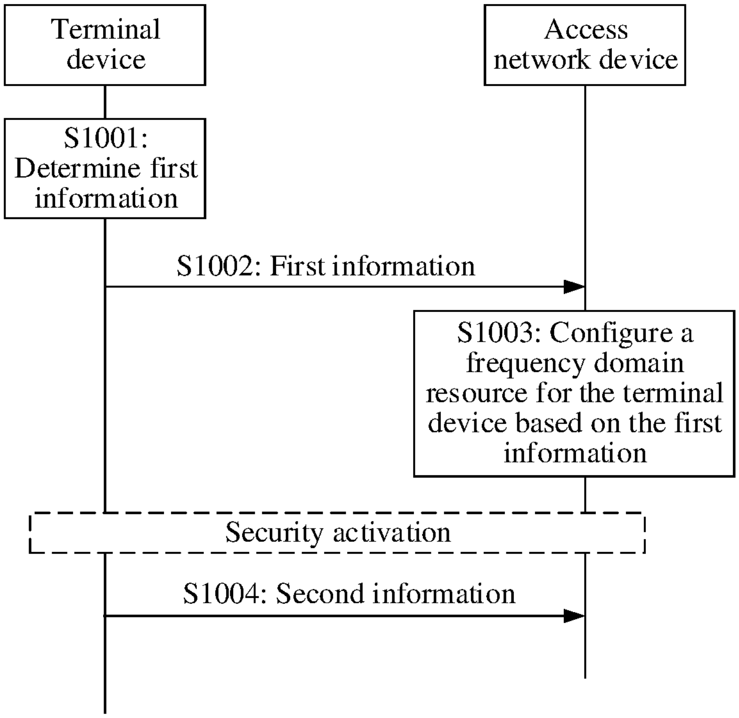
FIG. 10 is a schematic flowchart of a communication method according to an embodiment of this application.

Currently, when reporting an MII, the terminal device reports a multicast frequency list, a priority of the multicast service, a TMGI list, and the like. If the terminal device reports the MII before security activation, transmission of detailed information about the multicast service is insecure, and consequently a security risk is caused. However, if the MII is reported after the security activation, the access network device allocates a unicast service resource, for example, an initial BWP, to the terminal device after the terminal device is securely activated. After receiving the MII reported by the terminal device, the access network device reconfigures the initial BWP based on the MII, for example, configures a bandwidth of the initial BWP as a bandwidth of a CFR. This causes high signaling overheads, and causes a long interruption delay of the multicast service. Based on this, an embodiment of this application further provides a communication method, to reduce signaling overheads and improve continuity of a multicast service when ensuring communication security. As shown in FIG. 10, the method specifically includes the following steps.

S1001: A terminal device determines first information and second information.

The first information indicates that the terminal device is interested in a multicast service, and the second information indicates the multicast service that the terminal device is interested in.

Optionally, S1001 may be an optional step.

S1002: The terminal device sends the first information. Correspondingly, an access network device receives the first information.

For example, the first information may include at least one of the following: an interested frequency list, a priority of the multicast service, or a broadcast CFR. To be specific, the terminal device may implicitly indicate, by using at least one of the following, that the terminal device is interested in the multicast service: the interested frequency list, the priority of the multicast service, or the broadcast CFR.

Alternatively, the terminal device may indicate the first information in another manner, for example, explicitly indicate the first information by using one bit.

In an implementation, the interested frequency list, the priority of the multicast service, or the broadcast CFR may alternatively be sent after security activation, for example, sent together with the second information. In this implementation, the terminal device may send the first information in another manner, for example, explicitly indicate, by using one bit, that the terminal device is interested in the multicast service.

Specifically, the first information may be sent by using an RRC setup complete (RRCSetupComplete) message, an RRC setup request (RRCSetupRequest) message, or another message.

S1003: The access network device configures a frequency domain resource for the terminal device based on the first information, for example, configures an initial BWP for the terminal device, where a bandwidth of the initial BWP is equal to a bandwidth of a CFR.

S1004: The terminal device sends the second information. Correspondingly, the access network device receives the second information.

The second information indicates the multicast service that the terminal device is interested in.

For example, the second information may include a multicast service identifier, a multicast service identifier, or an internet protocol (internet protocol, IP) group address. For example, the multicast service identifier or the multicast service identifier may be a TMGI.

The second information may be sent by using terminal device assistance information (UEAssistanceInformation), a security mode complete (SecurityModeComplete) message, another message, or the like.

Optionally, in S1005, the terminal device may receive the interested multicast service on the configured frequency domain resource, for example, may receive the interested multicast service in the configured initial BWP.

The first information is sent before the security activation, and the second information is sent after the security activation. S1003 may be performed before or after the security activation. This is not specifically limited herein.

In an example, a security activation process may include: The access network device sends a security mode command to the terminal device, where the security mode command carries a key. Then, the terminal device sends a security mode complete message to the access network device. Based on this example, in a specific implementation, the first information may be sent before the security mode command is received from the access network device or before the security mode complete message is sent, and the second information may be sent after the security mode complete message is sent.

In a possible implementation, the terminal device may send the first information before the security activation and send the second information after the security activation when at least one of the following conditions is satisfied:

a cell/an access network device accessed by the terminal device is providing a multicast service;

a cell/an access network device accessed by the terminal device is to provide a multicast service;

a cell/an access network device accessed by the terminal device supports providing of a multicast service;

the terminal device is receiving or expects to receive a multicast service in a currently accessed cell/access network device;

a multicast service that the terminal device is receiving or expects to receive is being provided/to be provided/supported to be provided by a currently accessed cell/access network device;

a cell currently accessed by the terminal device broadcasts a SIB used to provide multicast service information;

a cell currently accessed by the terminal device broadcasts a first SIB, where the first SIB carries multicast control configuration information (MCCH);

a bandwidth of a CFR of a multicast service provided by a cell currently accessed by the terminal device is different from a bandwidth of an initial BWP configured by using a system message;

a bandwidth of a CFR of a multicast service provided by a cell currently accessed by the terminal device is greater than a bandwidth of an initial BWP configured by using a system message; or the terminal device receives third information from the access network device, where the third information indicates that the terminal device sends the first information before the security activation and sends the second information after the security activation. Optionally, the third information is carried in a broadcast message.

In this embodiment of this application, before the security activation, the access network device is indicated that the terminal device is interested in the multicast service, so that the access network device can configure, for the terminal device, a resource used for the multicast service, for example, a CFR. Therefore, after a resource used for a unicast service is configured, the resource does not need to be reconfigured based on the multicast service. For example, after an initial bandwidth part (initial BWP) is configured, a bandwidth of the initial BWP does not need to be configured as a bandwidth of the CFR based on the multicast service. This manner can reduce signaling overheads, and help ensure continuity of the multicast service. In addition, information related to the multicast service that the terminal device is interested in is sent after the security activation, so that specific information of an MBS can be avoided from being transmitted in an insecure environment, to improve communication security.

It should be noted that, the method in FIG. 7 and the method in FIG. 10 may be separately implemented as independent solutions, or may be combined as one solution for implementation. For example, in the method in FIG. 7, the terminal device may send an MII to the access network device by using the method in FIG. 10, to be specific, send first information before security activation. Specifically, the first information may be implicitly indicated by using information such as an interested frequency list, a priority of a multicast service, or a broadcast CFR, or may be explicitly indicated by using one bit, and second information is sent after the security activation.

In a specific implementation, in an implementation in which the first information is explicitly indicated by using one bit, information such as the interested frequency list, the priority of the multicast service, the broadcast CFR, or a modulation order for a multicast service that is being received or expected to be received may be sent before the security activation, for example, may be sent together with the first information; or may be sent after the security activation, for example, may be sent together with the second information. Alternatively, a part of the information such as the interested frequency list, the priority of the multicast service, the broadcast CFR, or the modulation order for the multicast service that is being received or expected to be received may be sent before the security activation, and the other part of the information is sent after the security activation.

Figure 11:
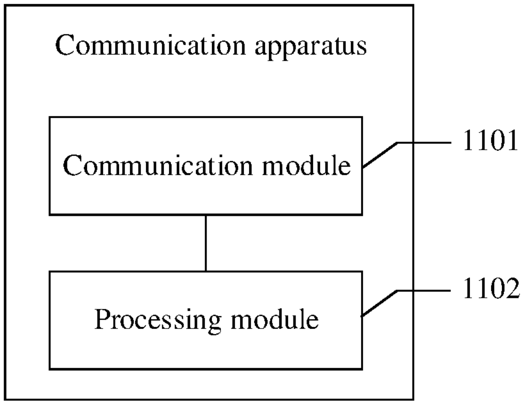
FIG. 11 is a schematic diagram of a structure of a communication apparatus according to an embodiment of this application.

Based on a same concept as the method embodiments, an embodiment of this application provides a communication apparatus. A structure of the communication apparatus may be shown in FIG. 11. The communication apparatus includes a communication module 1101 and a processing module 1102.

In an implementation, the communication apparatus may be specifically configured to implement the method performed by the terminal device in the embodiment in FIG. 7. The apparatus may be a terminal device, or may be a chip, a chip set, or a part of a chip that is in the terminal device and that is configured to perform a related method function. The processing module 1102 is configured to determine capability information, where the capability information indicates a multicast service receiving capability corresponding to a band, and/or a multicast service receiving capability corresponding to a component carrier CC. The communication module 1101 is configured to send the capability information to an access network device.

Optionally, the communication module 1101 is further configured to send indication information to the access network device, where the indication information indicates a modulation order for a multicast service that the terminal device is receiving or expects to receive.

Optionally, the communication module 1101 is further configured to: before the processing module 1102 determines the capability information, receive capability reporting indication information from the access network device, where the capability reporting indication information indicates the terminal device to report a multicast service receiving capability.

For example, the capability information includes a first band combination list and an identifier of a first feature set combination, where the first band combination list includes first band information, the first band information includes identifiers of N bands that support reception of a multicast service, and N is an integer greater than 0; and the first feature set combination includes at least one first parameter set corresponding to the first band combination list, where any first parameter set indicates a multicast service receiving capability corresponding to each of the N bands, and/or a multicast service receiving capability corresponding to a CC on each of the N bands.

Optionally, the first band combination list further includes second band information, where the second band information includes identifiers of M bands that support a unicast service, and M is an integer greater than 0; and any first parameter set further indicates a unicast service receiving capability corresponding to each of the M bands; or any first parameter set further indicates a communication service receiving capability corresponding to each of the M bands, where a communication service includes a unicast service and a multicast service.

For example, the capability information includes a second band combination list and an identifier of a second feature set combination, where the second band combination list includes identifiers of N bands that support reception of a multicast service, and N is an integer greater than 0; and the second feature set combination includes Q1 groups of parameters corresponding to the second band combination list, where each group of parameters includes Q2 second parameter sets, and any second parameter set indicates a multicast service receiving capability corresponding to each of the N bands, and/or a multicast service receiving capability corresponding to a CC on each of the N bands, where Q1 is an integer greater than 0, and Q2 is an integer greater than 0.

Optionally, the capability information further includes a third band combination list, where the third band combination list includes identifiers of M bands that support reception of a unicast service, and M is an integer greater than 0; and the second feature set combination further includes Q2 third parameter sets corresponding to the third band combination list, and any third parameter set indicates a unicast service receiving capability corresponding to each of the M bands, where second parameter set i in the Q2 second parameter sets corresponds to first parameter set i in any group of the Q1 groups of parameters, and i is an integer greater than 0 and not greater than Q2.

For example, the capability information includes a second band combination list and identifiers of Q1 third feature set combinations, where the second band combination list includes identifiers of N bands that support reception of a multicast service, and N is an integer greater than 0; and any third feature set combination includes Q2 fourth parameter sets, and any fourth parameter set indicates a multicast service receiving capability corresponding to each of the N bands, and/or a multicast service receiving capability corresponding to a CC on each of the N bands, where Q1 is an integer greater than 0, and Q2 is an integer greater than 0.

Optionally, the capability information further includes a third band combination list and an identifier of a fourth feature set combination, where the third band combination includes identifiers of M bands that support reception of a unicast service, and M is an integer greater than 0; and the fourth feature set combination includes Q2 fifth parameter sets, and any fifth parameter set indicates a unicast service receiving capability corresponding to each of the M bands.

For example, the capability information includes a fourth band combination list and an identifier of a fifth feature set combination, where the fourth band combination list includes identifiers of X bands supported by the terminal device, and X is an integer greater than 0; and the fifth feature set combination includes at least one sixth parameter set, any sixth parameter set indicates a communication parameter corresponding to each of the X bands, the X bands include N bands that support reception of a multicast service, and a communication parameter corresponding to any one of the N bands indicates a multicast service receiving capability corresponding to the band, and/or a communication capability corresponding to a CC on the band, where if the CC supports reception of a multicast service, the communication capability corresponding to the CC is a multicast service receiving capability corresponding to the CC, and N is an integer greater than 0 and not greater than X.

Optionally, that any sixth parameter set indicates a communication parameter corresponding to each of the X bands includes: Any sixth parameter set includes an index of the communication parameter corresponding to each of the X bands. An index of a communication parameter for any one of the X bands satisfies: If the band supports reception of a multicast service, the index of the communication parameter corresponding to the band belongs to a first index set; and if the band does not support reception of a multicast service, the index of the communication parameter corresponding to the band belongs to a second index set.

Optionally, that a communication parameter corresponding to any one of the N bands indicates a communication capability corresponding to a CC on the band includes: The communication parameter corresponding to any one of the N bands includes an index of the communication capability corresponding to the CC on the band, and an index of a communication capability corresponding to any CC on the band satisfies: if the CC supports reception of a multicast service, the index of the communication capability corresponding to the CC belongs to a third index set; and if the CC does not support reception of a multicast service, the index of the communication capability corresponding to the CC belongs to a fourth index set.

In example description, the multicast service receiving capability corresponding to the band includes at least one of the following: the band supports reception of a multicast service, or a communication parameter for receiving the multicast service on the band.

In example description, the multicast service receiving capability corresponding to the CC includes: The CC supports reception of a multicast service, and/or communication information for receiving the multicast service on the CC, where the communication information is a communication parameter for receiving the multicast service on the CC, or the communication information is a capability value of the CC, and the capability value is determined based on the communication parameter for receiving the multicast service on the CC.

In addition, the communication parameter for receiving a multicast service includes a highest modulation order supported during reception of a multicast service.

In an implementation, the communication apparatus may be specifically configured to implement the method performed by the access network device in the embodiment in FIG. 7. The apparatus may be an access network device, or may be a chip, a chip set, or a part of a chip that is in the access network device and that is configured to perform a related method function. The communication module 1101 is configured to receive capability information from a terminal device, where the capability information indicates a multicast service receiving capability corresponding to a band, and/or a multicast service receiving capability corresponding to a component carrier CC. The processing module 1102 is configured to determine a capability of the terminal device based on the capability information.

Optionally, the communication module 1101 is further configured to receive indication information from the terminal device, where the indication information includes a modulation order for a multicast service that the terminal device is receiving or expects to receive.

Optionally, the communication module 1101 is further configured to: before the capability information from the terminal device is received, send capability reporting indication information to the terminal device, where the capability reporting indication information indicates the terminal device to report a multicast service receiving capability.

For example, the capability information includes a first band combination list and an identifier of a first feature set combination, where the first band combination list includes first band information, the first band information includes identifiers of N bands that support reception of a multicast service, and N is an integer greater than 0; and the first feature set combination includes at least one first parameter set corresponding to the first band combination list, where any first parameter set indicates a multicast service receiving capability corresponding to each of the N bands, and/or a multicast service receiving capability corresponding to a CC on each of the N bands.

Optionally, the first band combination list further includes second band information, where the second band information includes identifiers of M bands that support a unicast service, and M is an integer greater than 0; and any first parameter set further indicates a unicast service receiving capability corresponding to each of the M bands; or any first parameter set further indicates a communication service receiving capability corresponding to each of the M bands, where a communication service includes a unicast service and a multicast service.

For example, the capability information includes a second band combination list and an identifier of a second feature set combination, where the second band combination list includes identifiers of N bands that support reception of a multicast service, and N is an integer greater than 0; and the second feature set combination includes Q1 groups of parameters corresponding to the second band combination list, where each group of parameters includes Q2 second parameter sets, and any second parameter set indicates a multicast service receiving capability corresponding to each of the N bands, and/or a multicast service receiving capability corresponding to a CC on each of the N bands, where Q1 is an integer greater than 0, and Q2 is an integer greater than 0.

Optionally, the capability information further includes a third band combination list, where the third band combination list includes identifiers of M bands that support reception of a unicast service, and M is an integer greater than 0; and the second feature set combination further includes Q2 third parameter sets corresponding to the third band combination list, and any third parameter set indicates a unicast service receiving capability corresponding to each of the M bands, where second parameter set i in the Q2 second parameter sets corresponds to first parameter set i in any group of the Q1 groups of parameters, and i is an integer greater than 0 and not greater than Q2.

For example, the capability information includes a second band combination list and identifiers of Q1 third feature set combinations, where the second band combination list includes identifiers of N bands that support reception of a multicast service, and N is an integer greater than 0; and any third feature set combination includes Q2 fourth parameter sets, and any fourth parameter set indicates a multicast service receiving capability corresponding to each of the N bands, and/or a multicast service receiving capability corresponding to a CC on each of the N bands, where Q1 is an integer greater than 0, and Q2 is an integer greater than 0.

Optionally, the capability information further includes a third band combination list and an identifier of a fourth feature set combination, where the third band combination includes identifiers of M bands that support reception of a unicast service, and M is an integer greater than 0; and the fourth feature set combination includes Q2 fifth parameter sets, and any fifth parameter set indicates a unicast service receiving capability corresponding to each of the M bands.

For example, the capability information includes a fourth band combination list and an identifier of a fifth feature set combination, where the fourth band combination list includes identifiers of X bands supported by the terminal device, and X is an integer greater than 0; and the fifth feature set combination includes at least one sixth parameter set, any sixth parameter set indicates a communication parameter corresponding to each of the X bands, the X bands include N bands that support reception of a multicast service, and a communication parameter corresponding to any one of the N bands indicates a multicast service receiving capability corresponding to the band, and/or a communication capability corresponding to a CC on the band, where if the CC supports reception of a multicast service, the communication capability corresponding to the CC is a multicast service receiving capability corresponding to the CC, and N is an integer greater than 0 and not greater than X.

Optionally, that any sixth parameter set indicates a communication parameter corresponding to each of the X bands includes: Any sixth parameter set includes an index of the communication parameter corresponding to each of the X bands. An index of a communication parameter for any one of the X bands satisfies: If the band supports reception of a multicast service, the index of the communication parameter corresponding to the band belongs to a first index set; and if the band does not support reception of a multicast service, the index of the communication parameter corresponding to the band belongs to a second index set.

Optionally, that a communication parameter corresponding to any one of the N bands indicates a communication capability corresponding to a CC on the band includes: The communication parameter corresponding to any one of the N bands includes an index of the communication capability corresponding to the CC on the band, and an index of a communication capability corresponding to any CC on the band satisfies: if the CC supports reception of a multicast service, the index of the communication capability corresponding to the CC belongs to a third index set; and if the CC does not support reception of a multicast service, the index of the communication capability corresponding to the CC belongs to a fourth index set.

In example description, the multicast service receiving capability corresponding to the band includes at least one of the following: the band supports reception of a multicast service, or a communication parameter for receiving the multicast service on the band.

In example description, the multicast service receiving capability corresponding to the CC includes: The CC supports reception of a multicast service, and/or communication information for receiving the multicast service on the CC, where the communication information is a communication parameter for receiving the multicast service on the CC, or the communication information is a capability value of the CC, and the capability value is determined based on the communication parameter for receiving the multicast service on the CC.

In addition, the communication parameter for receiving a multicast service includes a highest modulation order supported during reception of a multicast service.

Module division in embodiments of this application is an example and is merely logical function division, and may be other division during actual implementation. In addition, functional modules in embodiments of this application may be integrated into one processor or may exist alone physically, or two or more modules may be integrated into one module. The integrated module may be implemented in a form of hardware, or may be implemented in a form of a software functional module. It may be understood that for functions or implementations of the modules in embodiments of this application, further refer to related description in the method embodiments.

Figure 12:
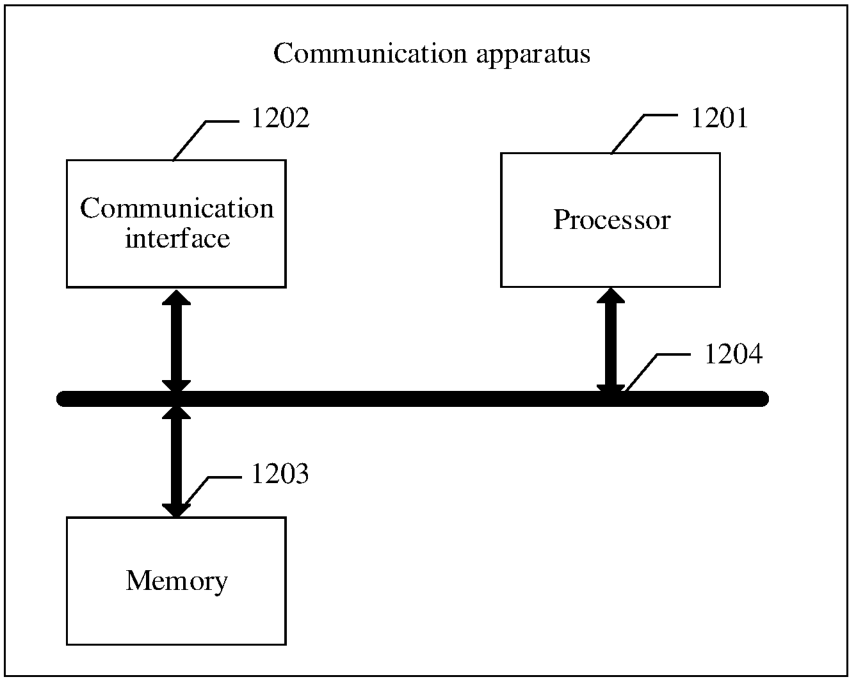
FIG. 12 is a schematic diagram of a structure of a communication apparatus according to an embodiment of this application.

In a possible implementation, the communication apparatus may be shown in FIG. 12. The apparatus may be a communication device or a chip in the communication device. The communication device may be the terminal device in the foregoing embodiment or the network device in the foregoing embodiment. The apparatus includes a processor 1201 and a communication interface 1202, and may further include a memory 1203. The processing module 1102 may be the processor 1201. The communication module 1101 may be the communication interface 1202.

The processor 1201 may be a CPU, a digital processing unit, or the like. The communication interface 1202 may be a transceiver, an interface circuit such as a transceiver circuit, a transceiver chip, or the like. The apparatus further includes the memory 1203, configured to store a program executed by the processor 1201. The memory 1203 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory 1203 is any other medium that can be used to carry or store expected program code in a form of instructions or a data structure and that can be accessed by a computer, but is not limited thereto.

The processor 1201 is configured to execute the program code stored in the memory 1203, and is specifically configured to perform the action of the processing module 1102. Details are not described again in this application. The communication interface 1202 is specifically configured to perform the action of the communication module 1101. Details are not described herein again in this application.

In this embodiment of this application, a specific connection medium between the communication interface 1202, the processor 1201, and the memory 1203 is not limited. According to this embodiment of this application, in FIG. 12, the memory 1203, the processor 1201, and the communication interface 1202 are connected to each other through a bus 1204. The bus is represented by using a thick line in FIG. 12. A manner of connection between other components is merely an example for description, but is not used as a limitation. Buses may be classified into an address bus, a data bus, a control bus, and the like. For ease of representation, only one bold line indicates the bus in FIG. 12, but this does not mean that there is only one bus or only one type of bus.

An embodiment of the present invention further provides a computer-readable storage medium, configured to store computer software instructions that need to be executed for execution of the foregoing processor, and the computer-readable storage medium includes a program that needs to be executed for execution of the foregoing processor.

An embodiment of this application further provides a communication system, including a communication apparatus configured to implement the function of the terminal device in the embodiment in FIG. 7 and a communication apparatus configured to implement the function of the network device in the embodiment in FIG. 7.

An embodiment of this application further provides a communication system, including a communication apparatus configured to implement the function of the terminal device in the embodiment in FIG. 10 and a communication apparatus configured to implement the function of the network device in the embodiment in FIG. 10.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used for implementing each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, wherein the method comprises:

receiving, by a source access network device, first indication information from a terminal device, wherein the first indication information indicates the terminal device is receiving or is interested to receive a multicast service, and the first indication information includes a first temporary mobile group identity (TMGI), wherein the first TMGI includes a public land mobile network (PLMN) index value; and sending, by the source access network device, second indication information to a target access network device, wherein the second indication information includes a second TMGI, wherein the second TMGI includes a PLMN value corresponding to the PLMN index value, and the second indication information is obtained by replacing the PLMN index value by the PLMN value.

2. The method according to claim 1, wherein, the second indication information is forwarded from the source access network device to the target access network device.

3. The method according to claim 1, wherein, the first indication information is a groupcast/multicast broadcast service (MBS) interest indication (MII).

4. The method according to claim 1, wherein, the first indication information indicates at least one of the following information of the multicast service that the terminal device is receiving or interested in to receive: frequency information, a temporary mobile group identity (TMGI), a subcarrier spacing (SCS), or a modulation order.

5. A communication method, wherein the method comprises:

sending, by a terminal device, first indication information to a source access network device, wherein the first indication information indicates the terminal device is receiving or expects to receive a multicast service, and the first indication information includes a first temporary mobile group identity (TMGI), wherein the first TMGI includes a public land mobile network (PLMN) index value; and wherein the PLMN index value is used to obtain a PLMN value of second indication information, the second indication information is sent from the source access network device to a target network device, the second indication information includes a second TMGI, and wherein the second TMGI includes the PLMN value, and the second indication information is obtained by replacing the PLMN index value by the PLMN value.

6. The method according to claim 5, wherein, the PLMN value in the second indication information corresponds to the PLMN index value in the first indication information.

7. The method according to claim 5, wherein, the second indication information is forwarded from the source access network device to the target network device.

8. The method according to claim 5, wherein, the first indication information is a groupcast/multicast broadcast service (MBS) interest indication (MII).

9. A communication apparatus, comprising:

a receiver; and a processor, configured to perform:

receiving, using the receiver, first indication information from a terminal device, wherein the first indication information indicates the terminal device is receiving or is interested to receive a multicast service, and the first indication information includes a first temporary mobile group identity (TMGI), wherein the first TMGI includes a public land mobile network (PLMN) index value; and sending second indication information to a target access network device, wherein the second indication information includes a second TMGI, wherein the second TMGI includes a PLMN value corresponding to the PLMN index value, and the second indication information is obtained by replacing the PLMN index value by the PLMN value.

10. The apparatus according to claim 9, wherein, the second indication information is forwarded from the apparatus to the target access network device.

11. The apparatus according to claim 9, wherein, the first indication information is a groupcast/multicast broadcast service (MBS) interest indication (MII).

12. The apparatus according to claim 9, wherein, the first indication information indicates at least one of the following information of the multicast service that the terminal device is receiving or interested in to receive: frequency information, a temporary mobile group identity (TMGI), a subcarrier spacing (SCS), or a modulation order.

13. The method according to claim 1, wherein, the second indication information is a groupcast/multicast broadcast service (MBS) interest indication (MII).

14. The method according to claim 5, wherein, the second indication information is a groupcast/multicast broadcast service (MBS) interest indication (MII).

15. The apparatus according to claim 9, wherein, the second indication information is a groupcast/multicast broadcast service (MBS) interest indication (MII).

16. The method according to claim 1, wherein the PLMN value corresponding to the PLMN index value is determined based on a PLMN identity information list, and the PLMN index value indicates a position of the PLMN value within the PLMN identity information list.

17. The method according to claim 5, wherein the PLMN value is determined based on the PLMN index value and a PLMN identity information list, and the PLMN index value indicates a position of the PLMN value within the PLMN identity information list.

18. The apparatus according to claim 9, wherein the PLMN value corresponding to the PLMN index value is determined based on a PLMN identity information list, and the PLMN index value indicates a position of the PLMN value within the PLMN identity information list.

19. The method according to claim 16, wherein the PLMN identity information list is carried in a system information block (SIB) 1.

20. The method according to claim 17, wherein the PLMN identity information list is carried in a system information block (SIB) 1.

* * * * *